(12) United States Patent
Iino

(10) Patent No.: US 7,228,419 B2
(45) Date of Patent: Jun. 5, 2007

(54) INFORMATION RECORDING MEDIUM, INFORMATION PROCESSING APPARATUS AND METHOD, PROGRAM RECORDING MEDIUM, AND INFORMATION PROCESSING SYSTEM

(75) Inventor: Yoichiro Iino, Tokyo (JP)

(73) Assignee: Sony Corporation, Tokyo (JP)

( * ) Notice: Subject to any disclaimer, the term of this patent is extended or adjusted under 35 U.S.C. 154(b) by 905 days.

(21) Appl. No.: 10/021,331

(22) Filed: Dec. 12, 2001

(65) Prior Publication Data

US 2002/0094090 A1   Jul. 18, 2002

(30) Foreign Application Priority Data

Dec. 13, 2000   (JP) ............................. 2000-378261

(51) Int. Cl.
*G06F 1/24* (2006.01)
(52) U.S. Cl. ...................... 713/170; 713/168; 713/171; 713/176; 713/182
(58) Field of Classification Search ................ 713/170, 713/168, 171, 176, 182
See application file for complete search history.

(56) References Cited

U.S. PATENT DOCUMENTS 5,389,738 A * 2/1995 Piosenka et al. ........... 174/52.4
5,563,946 A * 10/1996 Cooper et al. ................ 705/56
5,625,690 A * 4/1997 Michel et al. ................ 705/53
5,757,917 A * 5/1998 Rose et al. .................... 705/79

* cited by examiner

*Primary Examiner*—Thomas R. Peeso
(74) *Attorney, Agent, or Firm*—Frommer Lawrence & Haug LLP; William S. Frommer; Thomas F. Presson

(57) ABSTRACT

A ticket issuing device issues a highly convenient electronic ticket. The electronic ticket is formed of validity data and information to be validated. The validity data includes a secret key to which an algorithm whose presence is verifiable without being exposed is applicable. The information to be validated includes a public key corresponding to the secret key for verifying the presence of the secret key. The information is validated by the validity data. A ticket storage device generates a digital signature for verifying the presence of the secret key in the validity data, and sends the digital signature together with the information to be validated to a ticket checking device. The ticket checking device determines the presence of the secret key in the ticket storage device by using the digital signature from the ticket storage device and the public key contained in the information to be validated.

40 Claims, 19 Drawing Sheets

FIG. 4

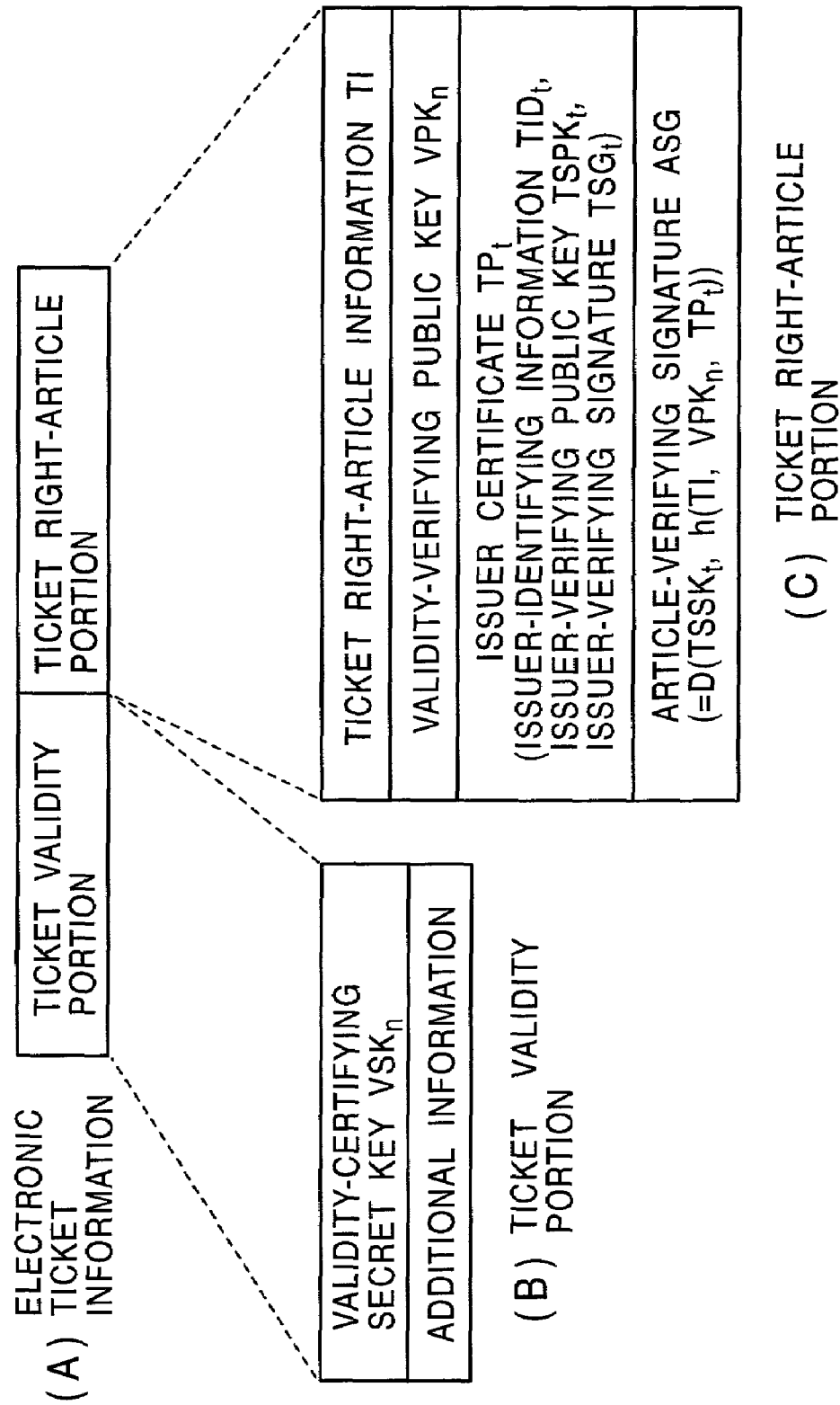

(A) ELECTRONIC TICKET INFORMATION

- TICKET VALIDITY PORTION
- TICKET RIGHT-ARTICLE PORTION (B) TICKET VALIDITY PORTION

- VALIDITY-CERTIFYING SECRET KEY $VSK_n$
- ADDITIONAL INFORMATION (C) TICKET RIGHT-ARTICLE PORTION

- TICKET RIGHT-ARTICLE INFORMATION TI
- VALIDITY-VERIFYING PUBLIC KEY $VPK_n$
- ISSUER CERTIFICATE $TP_t$ (ISSUER-IDENTIFYING INFORMATION $TID_t$, ISSUER-VERIFYING PUBLIC KEY $TSPK_t$, ISSUER-VERIFYING SIGNATURE $TSG_t$)
- ARTICLE-VERIFYING SIGNATURE ASG (=$D(TSSK_t, h(TI, VPK_n, TP_t))$)

INFORMATION RECORDING MEDIUM, INFORMATION PROCESSING APPARATUS AND METHOD, PROGRAM RECORDING MEDIUM, AND INFORMATION PROCESSING SYSTEM

BACKGROUND OF THE INVENTION

1. Field of the Invention

The present invention generally relates to information recording media, information processing apparatuses and methods, program recording media, and information processing systems. More particularly, the invention relates to an information recording medium, an information processing apparatus and method, a program recording medium, and an information processing system, all of which implement, for example, highly convenient electronic tickets.

2. Description of the Related Art

Transportation tickets, entrance tickets, reserved tickets, membership cards, license cards, service tickets, etc. are used to prove that owners of these cards and tickets possess the rights described therein.

Such cards and tickets are hereinafter simply referred to as "tickets". Tickets made of paper (including plastics similar to paper) are implemented by printing predetermined items on paper, which is convenient to be carried, and thus have "portability".

If paper tickets are implemented simply by printing, it is difficult to prevent forgery. Accordingly, hitherto, as a measure to prevent forgery, special printing is performed on paper, or a stamp or a watermark is added to the paper. Thus, paper tickets can be issued only by legal issuers, and cannot be easily forged. In this sense, paper tickets have a "right copy-preventing function".

Paper tickets also have a "right-validating function" for validating the rights possessed by the owners of the paper tickets, or an "assignment function" for easily assigning the rights described in the tickets to a third party.

Tickets can be reserved via a telephone line or a computer network. However, those who have reserved tickets have to receive the tickets by mail or collect them at the corresponding agents.

Along with the progress of computer network techniques, research and development is being made on electronic ticketing systems in which tickets are digitized and are directly sent and received via a communication network. Such digitized tickets are referred to as "electronic tickets". With electronic tickets, users do not have to collect tickets at the corresponding agents, and the ticket distribution and management costs can also be reduced.

As methods for implementing an electronic ticketing system, for example, a first method disclosed in Japanese Unexamined Patent Application Publication No. 8-147500 and a second method disclosed in Japanese Unexamined Patent Application Publication No. 11-31204 have been proposed.

In the first method, electronic ticket information is stored in tamper-proof hardware so as to prevent multiple use (exercise) of the rights associated with electronic tickets by copying the electronic ticket information.

Then, when receiving the services provided by electronic tickets, authentication is performed between a storage device for storing the electronic ticket information and a checking device for checking the electronic ticket information so as to authenticate both the storage device and the checking device as authorized devices in the electronic ticketing system. This authentication operation is performed by, for example, sending a special command from the checking device to the storage device according to an encryption technique. If both the storage device and the checking device are authenticated, the electronic ticket information stored in the storage device is transmitted from the storage device to the checking device.

As described above, according to the first method, by authenticating the storage unit and the checking unit for sending and receiving the electronic ticket information as authorized devices, it is possible to prevent the electronic ticket information from being illegally leaked to unauthorized devices.

Thus, in the first method, in order to validate the rights of electronic tickets, it is necessary to check whether a device to communicate with is authorized. Accordingly, electronic tickets according to the first method are not as convenient as paper tickets.

That is, with paper tickets, the rights of the tickets can be easily and safely validated by presenting the tickets to receivers without checking who is to receive the tickets or without being anxious about the illegal use of the rights. In the first method, however, the rights cannot be validated until a receiving device is authenticated and electronic ticket information for validating the rights is sent to the receiver.

Accordingly, in the second method, instead of sending and receiving electronic ticket information, predetermined processing is performed by using the electronic ticket information, and a processing result is sent and received. Then, the rights can be validated.

That is, in the second method, by employing a so-called "challenge and response technique", which is frequently used as an authentication method, the rights can be validated.

More specifically, a checking device for checking electronic tickets generates random numbers, and sends them to a storage device for storing electronic ticket information. Upon receiving the random numbers from the checking device, the storage device processes the random numbers by using private information contained in the electronic ticket information, and sends a processing result back to the checking device. The checking device then processes the processing result sent from the storage device by using public information, and checks whether the electronic ticket is authorized based on the processing result and the random numbers sent to the storage device.

The above-described challenge and response technique is performed by using, for example, a so-called "digital signature". The private information contained in the electronic ticket information serves as a secret key in a public key cryptosystem, while the public information used by the checking device serves as a public key corresponding to the secret key. The storage device processes the random numbers (challenge) sent from the checking device by using the secret key so as to generate a digital signature, and then, the checking device processes the digital signature (response) by using the public key, thereby verifying the digital signature against the original random numbers.

According to the above-described second method, the secret key, which is the private information contained in the electronic ticket information, cannot be identified from the public key, which is information publicly known. Additionally, during the challenge and response process, the secret key is not leaked outside the storage device. Thus, the rights associated with the electronic tickets can be easily and safely validated for a third party, as in paper tickets.

In the above-described Japanese Unexamined Patent Application Publication No. 11-31204, the following three points are described as the essential functions for electronic tickets.

The first point is a "right copy-preventing function" for preventing the use of tickets copied by illegal users. The second point is a "right-validating function" for proving the validity of the rights associated with electronic tickets to a third party including anonymous users. The third point is an "anonymity function" for guaranteeing the anonymity of the users when utilizing electronic tickets (when receiving the services for the electronic tickets by exercising the rights associated with the electronic tickets).

All of the above-described first through third functions are implemented by known paper tickets, and must also be maintained by electronic tickets without sacrificing the convenience of paper tickets.

In electronic tickets, however, in order to maintain convenience comparable to that of paper tickets, the above-described three features are not sufficient, and the following fourth and fifth functions are required.

A fourth point is an "assignment function" for assigning the rights concerning electronic tickets to the others. A fifth point is a "completeness function" for validating the rights of electronic tickets, i.e., for performing a "right-validating function", without the need to access a ticket management center or a management database.

The rights of paper tickets can be assigned to others. Thus, the "assignment function" is essential for electronic tickets to maintain a convenience comparable to that of paper tickets.

At a railway station or at an event entrance gate of a venue, the rights of paper tickets can be immediately checked by presenting or giving the tickets, thereby enabling the users to smoothly pass through the corresponding ticket gate. If it is necessary at a ticket gate to perform on-line checking on, for example, credit cards, or searching a database for checking a ticket number against the corresponding information in the database, the users cannot smoothly pass through the ticket gate. In this respect, the "completeness function" for validating the rights of electronic tickets only by using the electronic tickets is essential for the practical use of the electronic tickets.

However, the above-described second method does not satisfy the requirements for the "assignment function" and the "completeness function".

That is, in the second method, electronic tickets (or information acting as the electronic tickets) are issued by encrypting feature information (for example, secret keys in the public key cryptosystem) unique to the individual electronic tickets with different encryption keys unique to individual storage devices. Additionally, the encrypted feature information stored in the storage device can be decrypted only with the encryption key possessed by the corresponding storage device, thereby implementing the "right copy-preventing function". In the second method, the "right-validating function" of the electronic tickets is implemented by decrypting the encrypted feature information stored in the storage device with the encryption key stored in the same storage device and by using the decrypted feature information.

Accordingly, in the second method, the feature information of an electronic ticket can be decrypted only in the storage device which has issued the electronic ticket. Thus, the rights associated with the electronic ticket cannot be validated in storage devices other than the storage device which has issued the electronic ticket. This means that an electronic ticket issued in a certain storage device cannot be assigned to another storage device, i.e., the "assignment function" cannot be achieved.

Paper tickets possess two items, such as the "right articles" indicating the content written on paper tickets and the "validity" of the paper tickets which is difficult to forge or copy by the printing technique, the material, the stamp, or the watermark. The "right articles" and the "validity" are closely linked to each other by means of printing. That is, the "right articles" themselves are merely information, and can serve as a ticket when they are provided with the "validity" of electronic tickets represented by paper which is difficult to forge or copy on which the "right articles" are printed.

Thus, paper tickets are formed of the two closely linked items, such as "validity" and "right articles". With these two items, the five functions, i.e., "right copy-preventing function", "right-validating function", "anonymity function", "assignment function", and "completeness function", are fulfilled.

Between the "validity" and the "right articles" unique to paper tickets, the "validity" is particularly difficult to digitize while maintaining the features of paper tickets. Accordingly, in the second method, the "right copy-preventing function" is fulfilled at the expense of portability, which is a feature of paper tickets. That is, in the second method, the "validity" of electronic tickets is linked to a specific storage device, and the "right copy-preventing function" is fulfilled at the expense of the "assignment function".

Additionally, in the second method, the above-described challenge and response authentication technique is employed for validating the rights of electronic tickets. In this technique, a checking device sends an ID number for identifying a secret key to a storage device. By using the ID number, the storage device generates a digital signature from random numbers generated by the checking device. In the storage device, as discussed above, a secret key, which is feature information unique to each electronic ticket, is encrypted with an encryption key unique to the storage device. Upon receiving the ID number from the checking device, the storage device searches for the secret key corresponding to the ID number. The storage device then decrypts the secret key with the encryption key unique to the storage device, and processes the random numbers sent from the checking device by using the secret key, thereby generating a digital signature. The digital signature is then sent to the checking device, and the checking device processes the digital signature with the public key corresponding to the secret key specified by the ID number sent to the storage device. Then, the checking device verifies the digital signature based on a processing result, and validates (checks) the rights associated with the electronic ticket.

In the second method, therefore, by using the challenge and response authentication technique, as in paper tickets, the rights can be safely verified (validated) without exposing the secret key, which indicates the rights associated with the electronic ticket, outside the storage device.

However, in the second method, information for verifying (validating) the rights of an electronic ticket, i.e., in this case, information required for verifying the rights of an electronic ticket by the challenge and response authentication technique, is separately provided from the electronic ticket information, and such information must be identified by the checking device.

More specifically, in the second method, the public key corresponding to a secret key indicating the rights of an electronic ticket, and the ID number for identifying the secret key are publicized and registered in a ticket management center. Thus, in order to validate the rights associated with the electronic ticket, the checking device must access the ticket management center to obtain the ID number and the corresponding public key.

If the content of the rights validated by the checking device is always the same, the checking device has to access the ticket management center only once to obtain the ID number and the corresponding public key. However, considering the widespread use of electronic tickets, it is not practical to assume that the content of the rights validated by the checking device is always the same.

More specifically, assuming that railway tickets are implemented by electronic tickets, a ticket gate, which serves as a checking device, has to check electronic tickets, which are issued daily at different stations and which have different right contents depending on whether the ticket is for a local train or an express. Accordingly, the checking device is required to access the ticket management center to obtain an ID number, which differs according to the station, the day, and the type of train, and the corresponding public key. Thus, the time required for checking the electronic ticket is increased, thereby impeding the smooth passage of users through the ticket gates. This problem originates from the lack of the "completeness function" for validating the rights only by using electronic tickets.

The lack of the "completeness function" adversely influences the "assignment function". That is, without the "completeness function", to assign an electronic ticket, the checking device is required to access the ticket management center to verify whether the electronic ticket is valid, as discussed above. Accordingly, even if the "assignment function" is simply added to the electronic ticket, checking for the validity of the electronic tickets becomes complicated unless the electronic ticket has the "completeness function", thereby hampering the assignment of electronic tickets.

That is, generally, the validity of a paper ticket can be checked by examining the paper ticket. In other words, the validity of a paper ticket can be checked and be assigned from any user.

However, as discussed above, the validity of electronic tickets without the "completeness function" cannot be checked immediately. Thus, the electronic tickets cannot be assigned in a practical sense even if they are provided with the "assignment function". In other words, electronic tickets can be assigned only from the issuer of the tickets to users.

SUMMARY OF THE INVENTION

Accordingly, in view of the above background, it is an object of the present invention to implement highly convenient electronic tickets provided with not only a "right copy-preventing function", a "right-validating function", and an "anonymity function", but also an "assignment function" and a "completeness function".

In order to achieve the above-described object, according to one aspect of the present invention, there is provided an information recording medium on which validity data and information to be validated are recorded. The validity data includes secret information to which an algorithm whose presence is verifiable without being exposed is applicable, the validity data being used for verifying the validity of information. The information to be validated includes a verifying parameter for verifying the presence of the secret information, the information being validated by the validity data.

According to another aspect of the present invention, there is provided a first information processing apparatus including a validity-data generator for generating validity data including secret information to which an algorithm whose presence is verifiable without being exposed is applicable, the validity data being used for verifying the validity of information. A verifying-parameter generator generates a verifying parameter for verifying the presence of the secret information. An information-to-be-validated generator generates information to be validated which includes the verifying parameter and which is validated by the validity data. An output unit outputs a set of information consisting of the validity data and the information to be validated.

According to still another aspect of the present invention, there is provided a first information processing method including: a validity-data generating step of generating validity data including secret information to which an algorithm whose presence is verifiable without being exposed is applicable, the validity data being used for verifying the validity of information; a verifying-parameter generating step of generating a verifying parameter for verifying the presence of the secret information; an information-to-be-validated generating step of generating information to be validated which includes the verifying parameter and which is validated by the validity data; and an output step of outputting a set of information consisting of the validity data and the information to be validated.

According to a further aspect of the present invention, there is provided a first program recording medium on which a program to be executed by a computer is recorded. The program includes: a validity-data generating step of generating validity data including secret information to which an algorithm whose presence is verifiable without being exposed is applicable, the validity data being used for verifying the validity of information; a verifying-parameter generating step of generating a verifying parameter for verifying the presence of the secret information; an information-to-be-validated generating step of generating information to be validated which includes the verifying parameter and which is validated by the validity data; and an output step of outputting a set of information consisting of the validity data and the information to be validated.

According to a yet further aspect of the present invention, there is provided a second information processing apparatus for processing a set of information including validity data and information to be validated. The validity data includes secret information to which an algorithm whose presence is verifiable without being exposed is applicable, the validity data being used for verifying the validity of information. The information to be validated includes a verifying parameter for verifying the presence of the secret information, the information being validated by the validity data. The second information processing apparatus includes: a storage unit for storing the set of information; an information-to-be-validated transmitter for transmitting the information to be validated to a checking device for checking the information to be validated; and a verifying-data generator for generating verifying data for verifying the presence of the secret information and for transmitting the verifying data to the checking device.

According to a further aspect of the present invention, there is provided a second information processing method for processing a set of information including validity data and information to be validated. The validity data includes secret information to which an algorithm whose presence is verifiable without being exposed is applicable, the validity data being used for verifying the validity of information. The information to be validated includes a verifying parameter for verifying the presence of the secret information, the information being validated by the validity data. The second information processing method includes: an information-to-be-validated transmission step of transmitting the information to be validated to a checking device for checking the information to be validated; and a verifying-data generating step of generating verifying data for verifying the presence of the secret information and for transmitting the verifying data to the checking device.

According to a further aspect of the present invention, there is provided a second program recording medium for recording a program which controls a computer to process a set of information. The set of information includes validity data and information to be validated. The validity data includes secret information to which an algorithm whose presence is verifiable without being exposed is applicable, the validity data being used for verifying the validity of information. The information to be validated includes a verifying parameter for verifying the presence of the secret information, the information being validated by the validity data. The program includes: an information-to-be-validated transmission step of transmitting the information to be validated to a checking device for checking the information to be validated; and a verifying-data generating step of generating verifying data for verifying the presence of the secret information and for transmitting the verifying data to the checking device.

According to a further aspect of the present invention, there is provided a third information processing apparatus for checking a set of information including validity data and information to be validated. The validity data includes secret information to which an algorithm whose presence is verifiable without being exposed is applicable, the validity data being used for verifying the validity of information. The information to be validated includes a verifying parameter for verifying the presence of the secret information, the information being validated by the validity data. The third information processing apparatus includes: an information-to-be-validated receiver for receiving the information to be validated from an external device; a verifying-data receiver for receiving verifying data for verifying the presence of the secret information from the external device; and a presence determining unit for determining the presence of the secret information in the external device by using the verifying data and the verifying parameter contained in the information to be validated.

According to a further aspect of the present invention, there is provided a third information processing method for checking a set of information including validity data and information to be validated. The validity data includes secret information to which an algorithm whose presence is verifiable without being exposed is applicable, the validity data being used for verifying the validity of information. The information to be validated includes a verifying parameter for verifying the presence of the secret information, the information being validated by the validity data. The third information processing method includes: an information-to-be-validated receiving step of receiving the information to be validated from an external device; a verifying-data receiving step of receiving verifying data for verifying the presence of the secret information from the external device; and a presence determining step of determining the presence of the secret information in the external device by using the verifying data and the verifying parameter contained in the information to be validated.

According to a further aspect of the present invention, there is provided a third program recording medium for recording a program which controls a computer to perform processing for checking a set of information including validity data and information to be validated. The validity data includes secret information to which an algorithm whose presence is verifiable without being exposed is applicable, the validity data being used for verifying the validity of information. The information to be validated includes a verifying parameter for verifying the presence of the secret information, the information being validated by the validity data. The program includes: an information-to-be-validated receiving step of receiving the information to be validated from an external device; a verifying-data receiving step of receiving verifying data for verifying the presence of the secret information from the external device; and a presence determining step of determining the presence of the secret information in the external device by using the verifying data and the verifying parameter contained in the information to be validated.

According to a further aspect of the present invention, there is provided an information processing system including a first information processing apparatus, a second information processing apparatus, and a third information processing apparatus. The first information processing apparatus includes: a validity-data generator for generating validity data including secret information to which an algorithm whose presence is verifiable without being exposed is applicable, the validity data being used for verifying the validity of information; a verifying-parameter generator for generating a verifying parameter for verifying the presence of the secret information; an information-to-be-validated generator for generating information to be validated which includes the verifying parameter and which is validated by the validity data; and an output unit for outputting a set of information consisting of the validity data and the information to be validated. The second information processing apparatus includes: a storage unit for storing the set of information; an information-to-be-validated transmitter for transmitting the information to be validated to the third information processing apparatus for checking the information to be validated; and a verifying-data generator for generating verifying data for verifying the presence of the secret information and for transmitting the verifying data to the third information processing apparatus. The third information processing apparatus includes: an information-to-be-validated receiver for receiving the information to be validated from the second information processing apparatus; a verifying-data receiver for receiving the verifying data for verifying the presence of the secret information from the second information processing apparatus; and a presence determining unit for determining the presence of the secret information in the second information processing apparatus by using the verifying data and the verifying parameter contained in the information to be validated.

According to the present invention, highly convenient electronic tickets which can be handled as known paper tickets are implemented. It is also possible to distribute such electronic tickets in the information processing system according to the present invention.

BRIEF DESCRIPTION OF THE DRAWINGS

FIG. 4 illustrates the data format of an electronic ticket;

DESCRIPTION OF THE PREFERRED EMBODIMENTS

Figure 1:
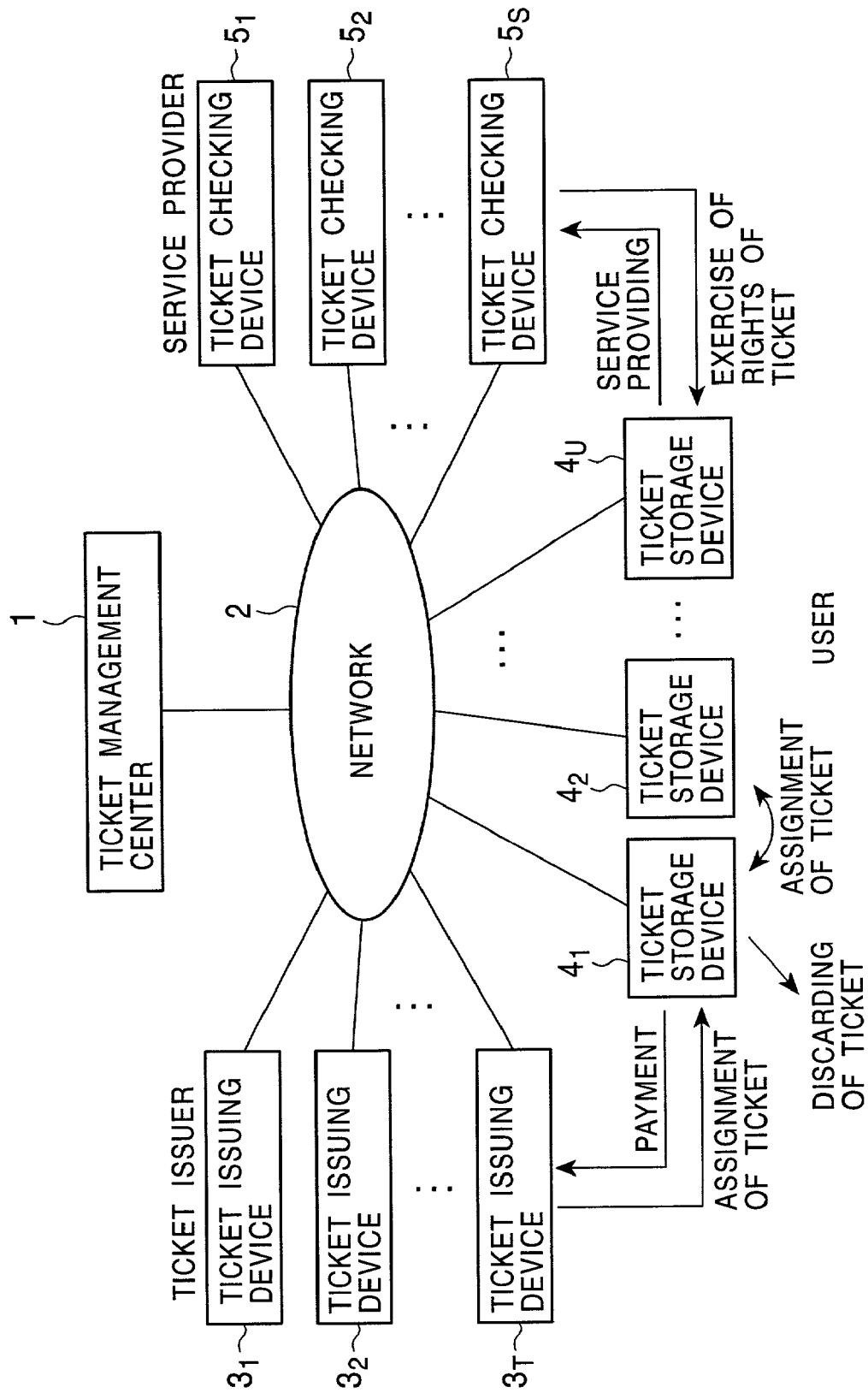
FIG. 1 is a block diagram illustrating the configuration of an electronic ticketing system according to an embodiment of the present invention.

FIG. 1 is a block diagram illustrating the configuration of an electronic ticketing system according to an embodiment of the present invention. In this specification, system means a logical set of a plurality of devices, and it is not essential that such devices be in the same casing.

The electronic ticketing system shown in FIG. 1 is formed by connecting a ticket management center 1, ticket issuing devices $3_1$, $3_2$, ..., $3_T$ (hereinafter collectively referred to as the "ticket issuing device $3_T$" unless it is necessary to individually distinguish them) possessed by ticket issuers, ticket storage devices $4_1$, $4_2$, ..., $4_U$ (hereinafter collectively referred to as the "ticket storage device $4_U$" unless it is necessary to individually distinguish them) possessed by users, and ticket checking devices $5_1$, $5_2$, ..., $5_S$ (hereinafter collectively referred to as the "ticket checking device $5_S$" unless it is necessary to individually distinguish them) possessed by service providers via a network 2.

The ticket management center 1 functions as a digital-signature certifying center. The network 2 is, for example, a public network, the Internet, a cable television (CATV) network, terrestrial waves, or a satellite network.

The ticket issuing device $3_T$ possessed by a ticket issuer issues electronic tickets (strictly speaking, electronic ticket information) and provides the electronic tickets to the ticket storage device $4_U$ possessed by a user.

The ticket issuing device $3_T$ may provide electronic tickets to the ticket storage device $4_U$ via the network 2, or may be directly sent to the ticket storage device $4_U$ wirelessly or by cable. The user of the ticket storage device $4_U$ pays the ticket issuing device $3_T$ for the electronic ticket if necessary. Accounting processing for the payment of the electronic ticket may be performed via the network 2, or may be directly performed between the ticket issuing device $3_T$ and the ticket storage device $4_U$ by communication. Alternatively, the payment for the electronic ticket may be made by directly transferring money to the ticket issuing device $3_T$.

The ticket storage device $4_U$ stores the electronic ticket (or electronic ticket information) issued by the ticket issuing device $3_T$. The user is able to exercise the rights associated with the electronic ticket stored in the ticket storage device $4_U$, and receives the services corresponding to the rights from the service provider (may be the same organization as the ticket issuer of the ticket issuing device $3_T$) owning the ticket checking device $5_S$.

The users may assign the electronic tickets (or the rights associated with the electronic tickets) by sending and receiving data between the ticket storage devices $4_U$. The electronic tickets can be assigned before being used. Alternatively, even after use, electronic tickets having an effective period or a limited number of uses can be assigned before the effective period expires or before the limited number of uses is exceeded. The ticket storage device $4_U$ is able to discard unnecessary electronic tickets, such as those whose effective period has expired or whose limited number of uses has been exceeded. The ticket storage device $4_U$ is also able to store a plurality of electronic tickets.

The ticket checking device $5_S$ checks (verifies) an electronic ticket stored in the ticket storage device $4_U$. As in the provision (assignment) of electronic tickets by the ticket issuing device $3_T$ to the ticket storage device $4_U$, electronic tickets may be checked via the network 2, and may be directly checked by communication between the ticket storage device $4_U$ and the ticket checking device $5_S$.

The ticket management center 1, the ticket issuing device $3_T$, the ticket storage device $4_U$, and the ticket checking device $5_S$ can all be formed of, for example, computers. Alternatively, the ticket storage device $4_U$ may be formed of an integrated circuit (IC) card, and the ticket issuing device $3_T$ and the ticket checking device $5_S$ may be formed of an IC-card reader/writer. Alternatively, the ticket storage device $4_U$ may be formed of a portable terminal, for example, a cellular telephone or a personal digital assistant (PDA).

In the above-configured electronic ticketing system, electronic tickets having all of the above-described five functions, i.e., the "right copy-preventing function", the "right-validating function", the "anonymity function", the "assignment function", and the "completeness function", can be distributed.

That is, electronic tickets distributed in the electronic ticketing system shown in FIG. 1 include a "validity", which is protected from being copied but is transferable, and the "right articles" which are closely linked to the "validity". The "validity" of one electronic ticket is different from that of another electronic ticket.

Information indicating the "validity" of electronic tickets includes information which can be identified by authentication but is protected from being exposed, i.e., private information, such as information used for generating a digital signature (for example, a secret key in a public key cryptosystem or information which can be verified by the zero knowledge interactive proof). The "validity" also includes additional information, which is described below.

The information indicating the "validity" is stored in the ticket storage device $4_U$ according to a technique discussed below so that it is prevented from being copied or tampered with. The information indicating the "validity" cannot be identified even by the users of the ticket storage device $4_U$.

The information indicating the "right articles" is equivalent to information written on known paper tickets. Accordingly, if an electronic ticket is, for example, an event ticket, information indicating the "right articles" includes the time and date of the event, the place, the event name, etc. In electronic tickets, however, the information indicating the "right articles" also includes parameters for verifying the presence of the information indicating the "validity" (verifying parameters). If the information indicating the "validity" is a secret key in a public key cryptosystem used for generating a digital signature, the information indicating the "right articles" includes the public key corresponding to the secret key.

The information indicating the "right articles" also includes a certificate of the ticket issuer of an electronic ticket (an issuer certificate, which is described below) and a digital signature attached by the ticket issuer. The issuer certificate contained in the "right articles" validates the relationship between the ticket issuer and the public key used for verifying the presence of the "validity", thereby preventing the "right articles" from being tampered with and changing the relationship between the "right articles" and the corresponding "validity".

As discussed above, the "right articles" forming an electronic ticket are equivalent to information written on known paper tickets, and indicate the content of the rights associated with the electronic ticket. However, in order to verify the integrity (validity) of the electronic ticket, the presence of the "validity" is required. As discussed above, the information indicating the "validity" is not exposed while the presence is being verified.

Accordingly, the rights associated with the electronic ticket can be identified by a desired third party by presenting (outputting) the "right articles", and it can be determined whether the rights are valid according to the presence of the "validity", which is not exposed. Thus, even if the information itself indicating the "right articles" is copied by a dishonest third party, the integrity of the "right articles" cannot be verified due to the absence of the "validity". In this sense, the electronic ticket has not been copied. Accordingly, the information indicating the "right articles" can be handled without being worrying about copying by a third party.

For the implementation of an electronic ticket formed of the combination of "validity" and "right articles", the ticket management center 1 is required to serve as a certifying center for issuing a certificate to a ticket issuer (issuer certificate).

That is, the ticket management center 1 possesses a signature-generating secret key $S_{CA}$ for generating a digital signature, and a signature-verifying public key $P_{CA}$ corresponding to the secret key $S_{CA}$. The signature-generating secret key $S_{CA}$ is fully prevented from being exposed, while the signature-verifying public key $P_{CA}$ is publicly known and can be obtained by anyone via the network 2.

Then, the ticket management center 1 generates an issuer certificate by using the signature-generating secret key $S_{CA}$ and sends the issuer certificate to the ticket issuer. Since the issuer certificate is generated by using the signature-generating secret key $S_{CA}$, which is known to only the ticket management center 1, it cannot be issued by anyone except the ticket management center 1. It is thus possible to prevent an electronic ticket issued by a ticket issuer from being tapered with by anyone by using the issuer certificate and the signature of the ticket issuer, which is discussed below.

Four operations, such as "issuing", "exercising", "assigning", and "discarding", can be performed on electronic tickets.

The "issuing" of an electronic ticket is performed by the ticket issuing device $3_T$. When issuing the electronic ticket, it is not necessary to specify the owner (ticket storage device $4_U$) of the electronic ticket and to include such information in the electronic ticket. As a result, the electronic ticket issued by the ticket issuing device $3_T$ and provided or assigned to the ticket storage device $4_U$ may be transferred to another ticket storage device $4_U$ by the "assigning" operation. That is, as in paper tickets, the electronic tickets can be assigned.

The "exercising" of an electronic ticket (or the rights of an electronic ticket) can be performed by outputting the information indicating the "right articles" of the electronic ticket from the ticket storage device $4_U$ to the ticket checking device $5_S$, and by verifying the presence of the information indicating the "validity", which verifies the integrity of the "right articles", in the ticket storage device $4_U$.

That is, the ticket checking device $5_S$ verifies the integrity of the information indicating the "right articles" sent from the ticket storage device $4_U$. If the services corresponding to the "right articles" can be provided to the ticket storage device $4_U$, the ticket checking device $5_S$ then checks for the presence of the "validity", which verifies the validity of the electronic ticket, in the ticket storage device $4_U$.

To verify the presence of the "validity" is to validate the rights associated with the electronic ticket from the viewpoint of the ticket storage device $4_U$. The rights are validated according to, for example, the challenge and response authentication technique. More specifically, the ticket checking device $5_S$ sends random numbers to the ticket storage device $4_U$, and the ticket storage device $4_U$ generates a digital signature from the random numbers by using the "validity" information, and returns the digital signature to the ticket checking device $5_S$. The ticket checking device $5_S$ then determines whether the digital signature from the ticket storage device $4_U$ coincides with the original random numbers, thereby performing authentication of the digital signature. If the digital signature is successfully authenticated, the ticket checking device $5_S$ verifies the presence of the "validity" information corresponding to the information of the "right articles" in the ticket storage device $4_U$, i.e., the ticket checking device $5_S$ determines that the electronic ticket possessed by the ticket storage device $4_U$ is valid, thereby allowing the ticket storage device $4_U$ to exercise the rights associated with the electronic ticket. Then, the service provider provides predetermined services to the user of the ticket storage device $4_U$.

As described above, the "right-validating function" is exercised according to the challenge and response authentication technique, and thus, the "validity" information is not exposed. Accordingly, the validity of the rights can be proved to an unspecified third party while safely maintaining the rights associated with the electronic ticket (while preventing the electronic ticket from being copied or stolen).

Paper tickets are largely divided into two types, i.e., tickets which can be used as right certificates as many times as the user desires, and tickets with a limited number of uses, such as train tickets or coupon tickets, or tickets with a limited period of use, such as commuter tickets.

As in paper tickets, electronic tickets can also be divided into the above-described two types.

For example, electronic tickets with a limited number of uses can be implemented by including in the electronic tickets the actual number of uses and the maximum value indicating the limited number of uses. Then, the ticket checking device $5_S$ compares the actual number of uses with the maximum value, and if the actual number of uses exceeds the maximum value, the service provider refuses to provide the service.

In this case, if the maximum value is exceeded, the electronic ticket should be nullified. To nullify the ticket, it must be determined whether the actual number of uses exceeds the maximum value. Accordingly, it is necessary to write the actual number of uses and the maximum value into the electronic ticket so that they cannot be tampered with.

Electronic tickets with a limited period of use can also be implemented by including the limited period in the electronic tickets.

It is now assumed, for example, that a special express ticket for the "Shinkansen" (Japanese "bullet train") is implemented by an electronic ticket. In this case, it is necessary to prevent the train from being changed by using a special express ticket which has been used in another train. Additionally, when the user is on board the train with a special express ticket, he/she must present the ticket to a ticket conductor to prove his/her right to be on the train.

It is thus important that the checking device $5_S$ identify, not only the maximum value of a limited number of uses, but also, the actual number of uses, or information indicating whether the electronic ticket has been used (whether the rights associated with the electronic ticket have been previously exercised).

Accordingly, the rights of an electronic ticket can be exercised, or, from the viewpoint of the ticket storage device $4_U$, the rights can be validated, according to the following two approaches.

A first approach is to verify only the presence of the "validity" information in the ticket storage device $4_U$ by using a so-called "regular right-validating function". A second approach is to verify the presence of the "validity" information in the ticket storage device $4_U$ and also to verify the actual number of uses by using a so-called "function for validating the rights with a limited number of uses" (hereinafter simply referred to as the "restricted-right validating function").

Basically, the "restricted-right validating function" can be fulfilled by the challenge and response authentication technique, as in the "regular right-validating function". For performing the "restricted-right validating function", the ticket storage device $4_U$ generates a digital signature not only from random numbers sent from the ticket checking device $5_S$, but also from the actual number uses contained in the electronic ticket, and returns the digital signature and the actual number uses to the ticket checking device $5_S$. The ticket checking device $5_S$ verifies the presence of the "validity" information and checks the number of uses by using the digital signature and the actual number uses.

The user is able to select the "regular right-validating function" or the "restricted-right validating function" by, for example, operating the ticket storage device $4_U$.

The "assigning" of an electronic ticket can be performed by transferring both the "validity" information and the information of the "right articles", which form the electronic ticket possessed by a certain ticket storage device $4_U$ (or the ticket issuing device $3_T$), to another ticket storage device $4_U$. The "validity" information is transferred between the device of an assignor and the device of an assignee while the uniqueness of the "validity" is being maintained. In this specification the "uniqueness" means that the "validity" information is transferred while being prevented from being copied.

The "discarding" of an electronic ticket can be performed by deleting both the "validity" information and the information of the "right articles". The "discarding" of an electronic ticket is performed in an assignor which has assigned the electronic ticket. It is also performed in the ticket storage device $4_U$ or the ticket issuing device $3_T$ when an electronic ticket becomes invalid in excess of an effective period or the maximum value of a limited number of uses.

It is easier to copy digitized information of the "validity" of electronic tickets than that of paper tickets.

As for the "exercising" of an electronic ticket, the presence of the "validity" information can be verified according to the challenge and response authentication technique without exposing the information itself to the exterior. It is thus possible to prevent the "validity" information from being copied when validating the rights.

However, it is also necessary to prevent the "validity" information from being copied, not only when the rights of an electronic ticket are validated, but also when an electronic ticket is stored in the ticket storage device $4_U$, or when an electronic ticket is assigned, i.e., while the "validity" information is being transferred.

Considering the convenience of electronic tickets, it is desirable even in a general-purpose information processing apparatus, such as a personal computer, that the prevention of the copying of the "validity" information can be implemented simply by adding a minimal function.

Along with the widespread use of network distribution of music information, a technique for transferring and storing music information while being prevented from being copied has been proposed. Accordingly, the "validity" information of electronic tickets can also be prevented from being copied by employing this technique.

Music information is compressed according to a general-purpose music information compression format, such as MPEG1 Audio Layer 3 (MP3) or Adaptive TRansform Acoustic Coding (ATRAC). If such compressed music information is copied, it can be easily expanded and utilized. Accordingly, music information (hereinafter referred to as the "content") is processed according to an encryption technique, and even if it is copied while being transferred and stored, it cannot be utilized. As a result, illegal copying of the content can be prevented.

As one of the methods for protecting the content from being illegally copied, the method disclosed in Japanese Unexamined Patent Application Publication No. 11-328850 has been proposed. In this method, encrypted content, a content key for decrypting the content, and a hardware management circuit for managing a key unique to a device for storing the content are employed. In this method, the content is encrypted and stored, and even if it is read from the device, it cannot be utilized. The content key is encrypted with the unique key and is stored in the management circuit. Only when the content is decrypted, the content key is decrypted with the unique key. The content is encrypted and is then transferred in order to protect the content from eavesdropping. When the content is transferred, the content in the source device is deleted by the management circuit. The management circuit is tamperproof, thereby preventing the keys stored in the management circuit from being extracted or tampered with.

As the above-described system in which the content can be handled while being protected, for example, the Magic Gate system developed by the assignee to the present invention is provided.

For maintaining the uniqueness of the "validity" information of electronic tickets, the above-described method for storing and transferring the content while being protected from being copied can be employed. The "validity" information can easily be handled because it has a smaller size than the content, such as music information, and can also be set to a fixed size. The "validity" information is decrypted only when validating the rights, and thus, it can be more easily protected from being eavesdropped or tampered with than the content. Additionally, in a device for storing electronic tickets, a management circuit and a circuit for generating a digital signature for the "right validation" are integrally formed by hardware. It is thus relatively easy to prevent the leakage of the decrypted "validity" information. Accordingly, the "validity" information is handled more easily than the content in which decrypted data is sometimes transferred to and is processed in another device.

According to the above description, an electronic ticket distributed in the electronic ticketing system shown in FIG. 1 includes the "validity" information and the information of the "right articles", both pieces of information being unique to each other, and the uniqueness of the "validity" information can be maintained by using, for example, a hardware function of the ticket storage device $4_U$. With this configuration, the first function "right copy-preventing function" can be implemented. The second function "right-validating function" can be implemented by a mechanism for verifying the presence of the "validity" information. Since it is not necessary to specify the ticket storage device $4_U$ for performing the "right-validating function", the third function "anonymous function" can be fulfilled. Then, by transferring the "validity" information while maintaining the uniqueness, the fourth function "assignment function" can be fulfilled. By including information sufficient for validating the rights in the information of the "right articles" and by utilizing the "right-validating function", the fifth function "completeness function" can be achieved.

The role of the ticket management center 1 shown in FIG. 1 is described below with reference to FIGS. 2 and 3.

As discussed above, the ticket management center 1 functions as the digital-signature certifying center. That is, the ticket management center 1 issues a digital signature certificate by using, for example, a public key cryptosystem.

The public key cryptosystem is also referred to as an "asymmetric cryptosystem", which is an encryption algorithm in which a key for encrypting data and a key for decrypting the encrypted data are different, and it is very difficult to determine one key from another key. Generally, the encryption key is publicly known to the third party, and is thus referred to as a "public key", while the decryption key is not exposed to the third party, and is thus referred to as a "secret key".

According to the public key cryptosystem, unless the secret key is known, the original data (data before being encrypted with the public key) cannot be obtained even if the public key corresponding to the secret key or the data encrypted with the public key is known. As the public key cryptosystem, for example, the RSA (R. L. Rivest, A. Shamir, L. Adleman) encryption scheme, and the elliptic curve cryptosystem are known.

Assuming that a public key and a secret key assigned to a user #u are indicated by $P_U$ and $S_U$, data M encrypted with the public key $P_U$ is represented by $C=E(P_U,M)$, and data C decrypted with the secret key $S_U$ is represented by $M=D(S_U,C)$.

A digital signature is generated by decrypting the data M with the secret key $S_U$ by the user. That is, the user #u who has generated the data M calculates the equation expressed by $SG(M)=D(S_U,h(M))$ by using the secret key $S_U$, and the calculated result SG(M) becomes a digital signature.

In this equation, h( ) is a one-way hash function, and it is very difficult to predict an input value from an output value. As the one-way hash function, for example, MD5 (Message Digest 5) and SHA-1 (Secure Hashing Algorithm 1) are known.

The user #u sends the data M and the digital signature SG(M) as a data set (M,SG(M)). Upon receiving the data set (M,SG(M)), the receiver encrypts the digital signature SG(M) in the data set (M,SG(M)) with the public key $P_U$, and determines whether the resulting encryption result $E(P_U,SG(M))$ coincides with a result h(M) obtained by calculating the one-way hash function h( ) by using the data M in the data set (M,SG(M)) as the argument, i.e., whether equation $h(M)=E(PK,SG(M))$ hold true. If the two values are the same, it can be verified that the data M is not tampered with and that the digital signature SG(M) is attached by the user #u of the secret key $S_U$. As the digital signature, RSA signatures, ElGamal signatures, and elliptic curve ElGamal signatures are known.

Verifying that the data M is not tampered with or that the digital signature SG(M) is attached by the user #u of the secret key $S_U$ is hereinafter referred to as "signature verification". To perform the signature verification, it is necessary to identify the one-way hash function h( ), and it is hereinafter assumed that information for specifying the one-way hash function h( ) be contained in the public key $P_U$. According to the public key cryptosystem, it can also be verified that the user #u possesses the secret key $S_U$ (or the presence of the secret key $S_U$) according to the challenge and response authentication technique without knowing the secret key $S_U$.

More specifically, a verifier for verifying that the user #u possesses the secret key $S_U$ generates, for example, random numbers r (challenge), and encrypts the random numbers r with the public key $P_U$ of the user #u so as to obtain encrypted data $r'=E(P_U,r)$. The verifier sends the encrypted data r' to the user #u, and the user #u decrypts the encrypted data r' with the secret key $S_U$, and returns a decryption result $D(S_U,r')$ (response) to the verifier. The verifier then determines whether the decryption result $D(S_U,r')$ is equal to the original random numbers r. If they are equal, i.e., equation $r=D(S_U,r')$ holds true, it can be verified that the user #u possesses the secret key $S_U$.

The verifier may send the random numbers r to the user #u, and the user #u may calculate the one-way hash function h( ) from the random numbers r to obtain the value h(r). The user #u may then decrypt the value h(r) with the secret key $S_U$ to obtain a decryption result $r''=D(S_U,h(r))$. In this case, the verifier encrypts the decryption result r'' with the public key $P_U$ of the user #u to obtain an encryption result $E(P_U,r'')$. The verifier then determines whether the encryption result $E(P_U,r'')$ coincides with the value h(r) obtained by calculating the one-way hash function h( ) from the random numbers r, i.e., whether equation $h(r)=E(P_U,r'')$ holds true. Thus, it can be verified that the user #u possesses the secret key $S_U$.

It is also possible to verify whether the user #u possesses the secret key $S_U$ by using a digital signature in a manner similar to the above-described process without knowing the secret key $S_U$. That is, the verifier generates random numbers r and sends them to the user #u. The user #u calculates $SG(r)=D(SK,h(r))$ from the random numbers r by using the secret key $S_U$ to obtain a digital signature SG(r), and returns it to the verifier. The verifier then encrypts the digital signature SG(r) with the public key $P_U$ of the user #u to obtain an encryption result $E(P_U,SG(r))$. The verifier determines whether equation $h(r)=E(P_U,SG(r))$ holds true. If it holds true, it can be verified that the user #u possesses the secret key $S_U$.

As discussed above, it can be verified that the user #u possesses the secret key $S_U$ by using the corresponding public key $P_U$. Such verification is hereinafter sometimes referred to as "authentication".

For performing signature verification or authentication, it is necessary to identify the public key corresponding to a secret key possessed by a person to be verified or authenticated. However, if there are many users to be verified or authenticated, the same number of public keys as the users must be identified, which is troublesome. Accordingly, a method in which, if one public key is identified, it is possible to sequentially identify other public keys by using the initially identified key is defined by X.509 recommendations of the International Telecommunications Union—Telecommunications Standardization Sector (ITU-T).

The owner of the public key to be initially identified and the corresponding secret key is a certifying center (certifying authority (CA)), and the ticket management center 1 serves as such a certifying center.

The ticket management center 1 possesses the own public key and the corresponding secret key, which are respectively represented by $P_{CA}$ and $S_{CA}$. The public key $P_{CA}$ is publicly known to the third party, while the secret key $S_{CA}$ is not exposed to anyone other than the ticket management center 1.

It is now assumed that the public key and the secret key of a certain owner #n are represented by $P_n$ and $S_n$, respectively. The ticket management center 1 receives ID information $Info_n$ for identifying the owner #n and the public key $P_n$ from the owner #n, and generates a digital signature $SG_n = D(S_{CA}, h(Info_n, P_n))$ by using the own secret key $S_{CA}$. The ticket management center 1 then attaches the digital signature $SG_n$ to the ID information $Info_n$ and the public key $P_n$ received from the owner #n so as to issue a certificate $(Info_n, P_n, SG_n)$. Through this certificate $(Info_n, P_n, SG_n)$, the ticket management center 1 certifies the relationship between the owner #n specified by the ID information $Info_n$ and the public key $P_n$ of the owner #n.

That is, the owner #n sends the certificate $(Info_n, P_n, SG_n)$ to the verifier for verifying the relationship between the public key $P_n$ and the owner #n thereof. The verifier then verifies the digital signature $SG_n$ of the certificate $(Info_n, P_n, SG_n)$ by using the public key $P_{CA}$ of the ticket management center 1. Thus, it can be verified that the ID information $Info_n$ and the public key $P_n$ in the certificate $(Info_n, P_n, SG_n)$ are not tampered with, i.e., the integrity of the certificate $(Info_n, P_n, SG_n)$ can be verified. Then, it can be verified that the owner #n identified by the ID information $Info_n$ in the certificate $(Info_n, P_n, SG_n)$ possesses the public key $P_n$. Accordingly, if the ID information $Info_n$ indicates the name of the owner #n, the name $Info_n$ of the owner #n to be authenticated with the public key $P_n$ can be identified according to the certificate $(Info_n, P_n, SG_n)$.

Generally, the certificate includes information, such as the encryption algorithm and the type of one-way hash function h( ). In the above-described example, the digital signature $SG_n$ is generated for a set $(Info_n, P_n)$ of the ID information $Info_n$ and the public key $P_n$ in the ticket management center 1. If, however, it is not necessary to verify the owner #n of the public key $P_n$, the digital signature $SG_n$ is generated only for the public key $P_n$, and the certificate $(P_n, SG_n)$ obtained by attaching the digital signature $SG_n$ to the public key $P_n$ is issued. This certificate $(P_n, SG_n)$ can be used for verifying that the user to be authenticated with the public key $P_n$ is a legal user registered in the ticket management center 1, which serves as a certifying center.

Figure 2:
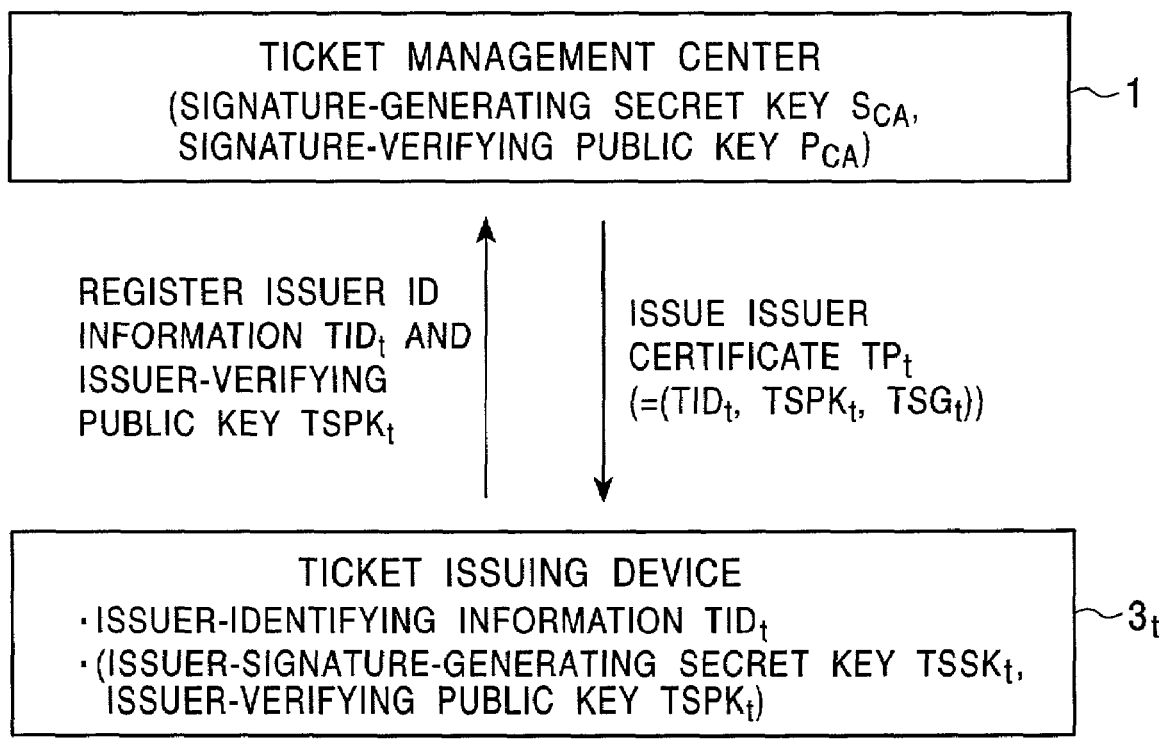
FIG. 2 illustrates the role of a ticket management center shown in FIG. 1.

The ticket issuing device $3_T$ stores, as shown in FIG. 2, issuer-identifying information $TID_t$ for identifying the ticket issuer of the ticket issuing device $3_T$, an issuer-signature-generating secret key $TSSK_t$ as a secret key for generating a digital signature of the ticket issuer, and an issuer-verifying public key $TSPK_t$ as a public key for verifying the digital signature. The issuer-identifying information $TID_t$ and the issuer-signature-verifying public key $TSPK_t$ are sent to the ticket management center 1 and are registered therein.

As discussed above, the ticket management center 1 stores the signature-generating secret key $S_{CA}$ for generating a digital signature and the signature-verifying public key $P_{CA}$ for verifying the digital signature. After registering the issuer-identifying information $TID_t$ and the issuer-signature-verifying public key $TSPK_t$ sent from the ticket issuing device $3_T$, the ticket management center 1 generates a digital signature $TSG_t$ for the issuer-identifying information $TID_t$ and the issuer-signature-verifying public key $TSPK_t$ by using the signature-generating secret key $S_{CA}$. The ticket management center 1 then attaches the digital signature $TSG_t$ to the issuer-identifying information $TID_t$ and the issuer-signature-verifying public key $TSPK_t$ so as to issue an issuer certificate $TP_t (=(TID_t, TSPK_t, TSG_t))$, which certifies (guarantees) the relationship between the ticket issuer identified by the issuer-identifying information $TID_t$ and the issuer-signature-verifying public key $TSPK_t$. This issuer certificate $TP_t$ is sent to the ticket issuing device $3_T$.

The ticket issuing device $3_T$ thus stores the issuer certificate $TP_t$ issued by the ticket management center 1.

Figure 3:
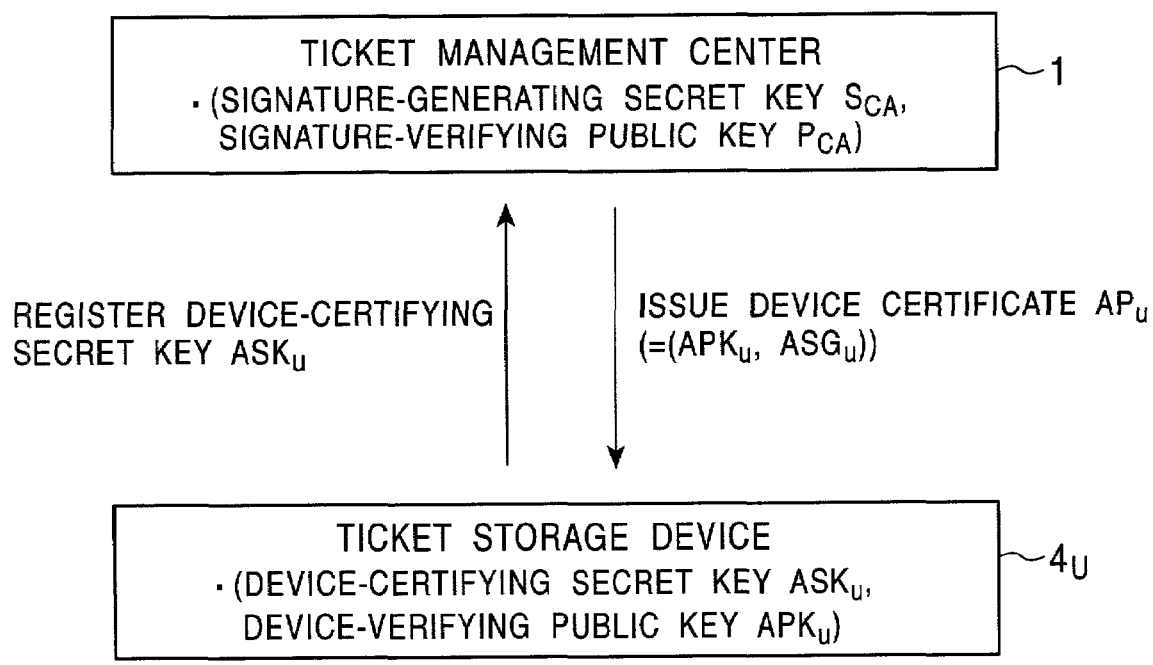
FIG. 3 illustrates the role of the ticket management center shown in FIG. 1.

The ticket storage device $4_U$ stores, as shown in FIG. 3, a device-certifying secret key $ASK_u$ as a secret key for certifying that the ticket storage device $4_U$ is a legal device registered in the electronic ticketing system shown in FIG. 1, and a device-verifying public key $APK_u$ as a public key for verifying that the ticket storage device $4_U$ is a legal device registered in the electronic ticketing system shown in FIG. 1.

The device-verifying public key $APK_u$ is sent to the ticket management center 1 and is registered. The ticket management center 1 generates a digital signature $ASG_u$ for the device-verifying public key $APK_u$ by using the signature-generating secret key $S_{CA}$, and attaches the digital signature $ASG_u$ to the device-verifying public key $APK_u$ so as to issue a device certificate $AP_u (=((APK_u, ASG_u))$ for certifying that the ticket storage device $4_U$ having the device-certifying secret key $ASK_u$ corresponding to the device-verifying public key $APK_u$ is a legal device.

The ticket storage device $4_U$ thus stores the device certificate $AP_u$ issued by the ticket management center 1.

FIG. 4 illustrates the format of electronic ticket information, i.e., the electronic ticket itself, issued by the ticket issuing device $3_T$.

The electronic ticket (electronic ticket information) includes, as indicated by (A) of FIG. 4, a ticket validity portion ("validity" information), and a ticket right-article portion (information of the "right articles").

The ticket validity portion is formed of, as indicated by (B) of FIG. 4, a validity-certifying secret key $VSK_n$ and additional information.

The validity-certifying key $VSK_n$ is used for certifying the validity of the electronic ticket #n, and has a value unique to the electronic ticket #n. That is, the validity-certifying key $VSK_n$ is different according to the electronic ticket.

As the validity-certifying key $VSK_n$, data which can be identified without being exposed, for example, a secret key for decrypting encrypted data in a public key cryptosystem, a secret key for generating a digital signature, or data which can be verified by the zero knowledge interactive proof, can be employed.

The additional information may be information of the number of uses of the electronic ticket. The number of uses is set (initialized) to zero when the electronic ticket is issued.

The ticket right-article portion is formed of, as indicated by (C) of FIG. 4, ticket right-article information TI, a validity-verifying public key $VPK_n$, an issuer certificate $TP_t$, and an article-verifying signature ASG.

The ticket right-article information TI is equivalent to articles written on a paper ticket. By examining the articles, the content of the rights (the services provided by the ticket) can be identified. More specifically, if the electronic ticket is a train ticket, the ticket right-article information TI includes information, such as stations at which the user can start the journey, the travel zone, the time and date at which the user can use the ticket, etc.

The validity-verifying public key $VPK_n$ corresponds to the validity-certifying secret key $VSK_n$ of the ticket validity portion, and is used for verifying the presence of the validity-certifying secret key $VSK_n$.

The issuer certificate $TP_t$ is a certificate issued from the ticket management center 1 to the ticket issuer of the ticket issuing device $3_T$, and includes the issuer-identifying information $TID_t$, the issuer-verifying public key $TSPK_t$, and the issuer-verifying signature $TSG_t$ (see FIG. 2).

An article-verifying signature ASG is a digital signature $D(TSSK_t, h(TI, VPK_n, TP_t))$ generated for the ticket right-article information TI, the validity-verifying public key $VPK_n$, and the issuer certificate $TP_t$ by the ticket issuing device 3T by using the issuer-signature-generating secret key $TSSK_t$ (FIG. 2). Accordingly, by verifying the article-verifying signature ASG by using the issuer-verifying public key $TSPK_t$ contained in the issuer certificate $TP_t$, the integrity of the ticket right-article information TI, the validity-verifying public key $VPK_n$, and the issuer certificate $TP_t$ can be verified.

As discussed above, an electronic ticket is formed of the ticket validity portion and the ticket right-article portion. The ticket validity portion indicates the validity of the electronic ticket. Accordingly, if the ticket validity portion is prevented from being copied, the copying of the electronic ticket can also be prevented. Thus, the ticket right-article portion can be copied without presenting any problem. This makes it possible to provide sufficient information for the ticket right-article information TI, and the ticket right-article information TI can be publicized. Additionally, since the presence of the ticket validity portion can be proved without being exposed, it can be prevented from being leaked or copied. Thus, the rights can be validated to the unspecified third party.

Figure 5:
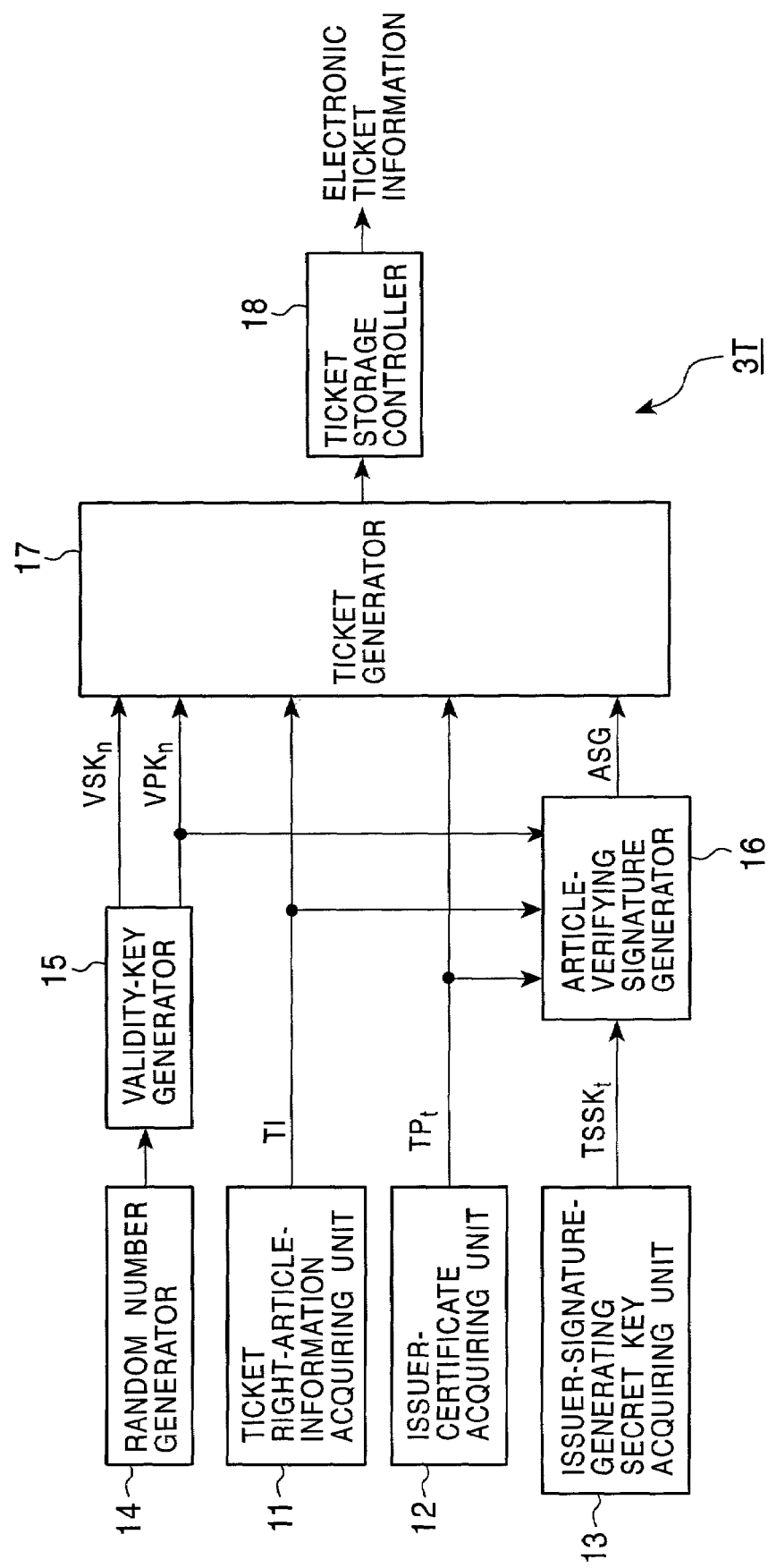
FIG. 5 is a block diagram illustrating the configuration of a ticket issuing device shown in FIG. 1.

FIG. 5 is a block diagram illustrating the configuration of the ticket issuing device $3_T$ shown in FIG. 1 for issuing the electronic ticket shown in FIG. 4.

A ticket right-article-information acquiring unit 11 acquires information corresponding to the ticket right-article information TI (FIG. 4) of an electronic ticket to generate the ticket right-article information TI, and supplies it to an article-verifying signature generator 16 and a ticket generator 17. If the electronic ticket is, for example, an event ticket, the information corresponding to the ticket right-article information TI may be the time and date, the place, the name, the effective period, the serial number of the event, etc. The format of the information is not restricted.

If the electronic ticket is for a repeated use, information concerning the effective period and the maximum number of uses is acquired by the ticket right-article-information acquiring unit 11 as the information corresponding to the ticket right-article information TI. The ticket right-article-information acquiring unit 11 may also acquire information registered in a database (not shown), or information input by a ticket issuer.

As discussed with reference to FIG. 2, an issuer-certificate acquiring unit 12 acquires the issuer certificate $TP_t$ issued by the ticket management center 1, and supplies it to the article-verifying signature generator 16 and the ticket generator 17.

An issuer-signature-generating secret key acquiring unit 13 acquires the issuer-signature-generating secret key $TSSK_t$, and supplies it to the article-verifying signature generator 16. The issuer-signature-generating secret key acquiring unit 13 may acquire the issuer-signature-generating secret key $TSSK_t$ stored in a memory device (not shown).

A random-number generator 14 generates random numbers for creating the validity-certifying secret key $VSK_n$ and the validity-verifying public key $VPK_n$, and supplies the random numbers to a validity-key generator 15.

The validity-key generator 15 generates the validity-certifying secret key $VSK_n$ and the validity-verifying public key $VPK_n$ based on the random numbers supplied from the random-number generator 14, and supplies the generated keys to the ticket generator 17. The validity-key generator 15 also supplies the validity-verifying public key $VPK_n$ to the article-verifying signature generator 16. Each of the validity-certifying secret key $VSK_n$ and the validity-verifying public key $VPK_n$ generated by the validity-key generator 15 is different according to the electronic ticket #n.

The article-verifying signature generator 16 generates the article-verifying signature ASG indicated by (C) of FIG. 4 for the ticket right-article information TI from the ticket right-article information acquiring unit 11, the issuer certificate $TP_t$ from the issuer-certificate acquiring unit 12, and the validity-verifying public key $VPK_n$ from the validity-key generator 15 by using the issuer-signature-generating secret key $TSSK_t$ supplied from the issuer-signature-generating secret key acquiring unit 13. The article-verifying signature generator 16 then supplies the article-verifying signature ASG to the ticket generator 17.

The ticket generator 17 generates additional information of an electronic ticket, such as that indicated by (B) of FIG. 4, and then generates a ticket validity portion of the electronic ticket from the additional information and the validity-certifying secret key $VSK_n$ supplied from the validity-key generator 15. The ticket generator 17 then generates a ticket right-article portion, such as that indicated by (C) of FIG. 4, from the ticket right-article information TI from the ticket right-article information acquiring unit 11, the issuer certificate $TP_t$ from the issuer-certificate acquiring unit 12, the validity-verifying public key $VPK_n$ from the validity-key generator 15, and the article-verifying signature ASG from the article-verifying-signature generator 16. Finally, the ticket generator 17 generates and issues an electronic ticket from the ticket validity portion and the ticket right-article portion, and supplies the electronic ticket to a ticket storage controller 18.

Basically, the ticket storage controller 18 has the functions similar to those of the ticket storage device $4_U$. That is, the ticket storage controller 18 stores the electronic ticket from the ticket generator 17, and in response to a request from the ticket storage device $4_U$, the ticket storage controller 18 outputs and assigns the electronic ticket to the ticket storage device $4_U$.

In the ticket issuing device $3_T$, the issuer-signature-generating secret key acquiring unit 13, the random-number generator 14, the validity-key generator 15, the article-verifying signature generator 16, the ticket generator 17, and the ticket storage controller 18 are tamper-proof.

The ticket issuing processing performed by the ticket issuing device $3_T$ shown in FIG. 5 is described below with reference to the flow chart of FIG. 6.

In this operation, it is assumed that the issuer certificate $TP_t$ has been obtained by the issuer-certificate acquiring unit 12 and supplied to the article-verifying signature generator 16 and the ticket generator 17, and that the issuer-signature-generating secret key $TSSK_t$ has been obtained by the issuer-signature-generating secret key acquiring unit 13 and supplied to the article-verifying signature generator 16.

In step S1, the random-number generator 14 generates random numbers, and supplies them to the validity-key generator 15. Then, the validity-key generator 15 generates the validity-certifying secret key $VSK_n$ and the validity-verifying public key $VPK_n$ based on the random numbers from the random-number generator 14, and supplies these keys to the ticket generator 17.

In step S2, the ticket generator 17 generates additional information of an electronic ticket, and then generates a ticket validity portion of the electronic ticket from the additional information and the validity-certifying secret key $VSK_n$ supplied from the validity-key generator 15. If the number of uses of the electronic ticket is limited, the information concerning the number of uses is included in the additional information. The number of uses is initialized to zero when additional information is created.

Thereafter, in step S3, the ticket right-article information acquiring unit 11 generates the ticket right-article information TI of the electronic ticket, and supplies it to the article-verifying signature generator 16 and the ticket generator 17. Then, in step S4, the article-verifying signature generator 16 generates the article-verifying signature ASG for the ticket right-article information TI from the ticket right-article information acquiring unit 11, the issuer certificate $TP_t$ from the issuer-certificate acquiring unit 12, and the validity-verifying public key $VPK_n$ from the validity-key generator 15 by using the issuer-signature-generating secret key $TSSK_t$ supplied from the issuer-signature-generating secret key acquiring unit 13. The article-verifying signature generator 16 then supplies the article-verifying signature ASG to the ticket generator 17.

In step S5, the ticket generator 17 generates a ticket right-article portion from the ticket right-article information TI from the ticket right-article information acquiring unit 11, the issuer certificate $TP_t$ from the issuer-certificate acquiring unit 12, the validity-verifying public key $VPK_n$ from the validity-key generator 15, and the article-verifying signature ASG from the article-verifying signature generator 16. Then, in step S6, the ticket generator 17 encrypts the ticket validity portion generated in step S2 according to, for example, a common key cryptosystem.

The common key cryptosystem is also referred to as a "symmetric cryptosystem". In the symmetric cryptosystem, a key for encrypting data and a key for decrypting data are the same, or even if they are different, it is easy to calculate one key from the other key. As the common key cryptosystem, for example, the data encryption standard (DES), Triple DES (produced by NIST) and the Fast data Encipherment ALgorithm (FEAL)(produced by NTT) are known.

In step S6, the ticket validity portion is encrypted. Then, in step S7, the ticket generator 17 generates an electronic ticket from the encrypted ticket validity portion and the ticket right-article portion, and supplies the electronic ticket to the ticket storage controller 18. In step S8, the ticket storage controller 18 stores the electronic ticket. Thus, the ticket issuing processing is completed.

Figure 6:
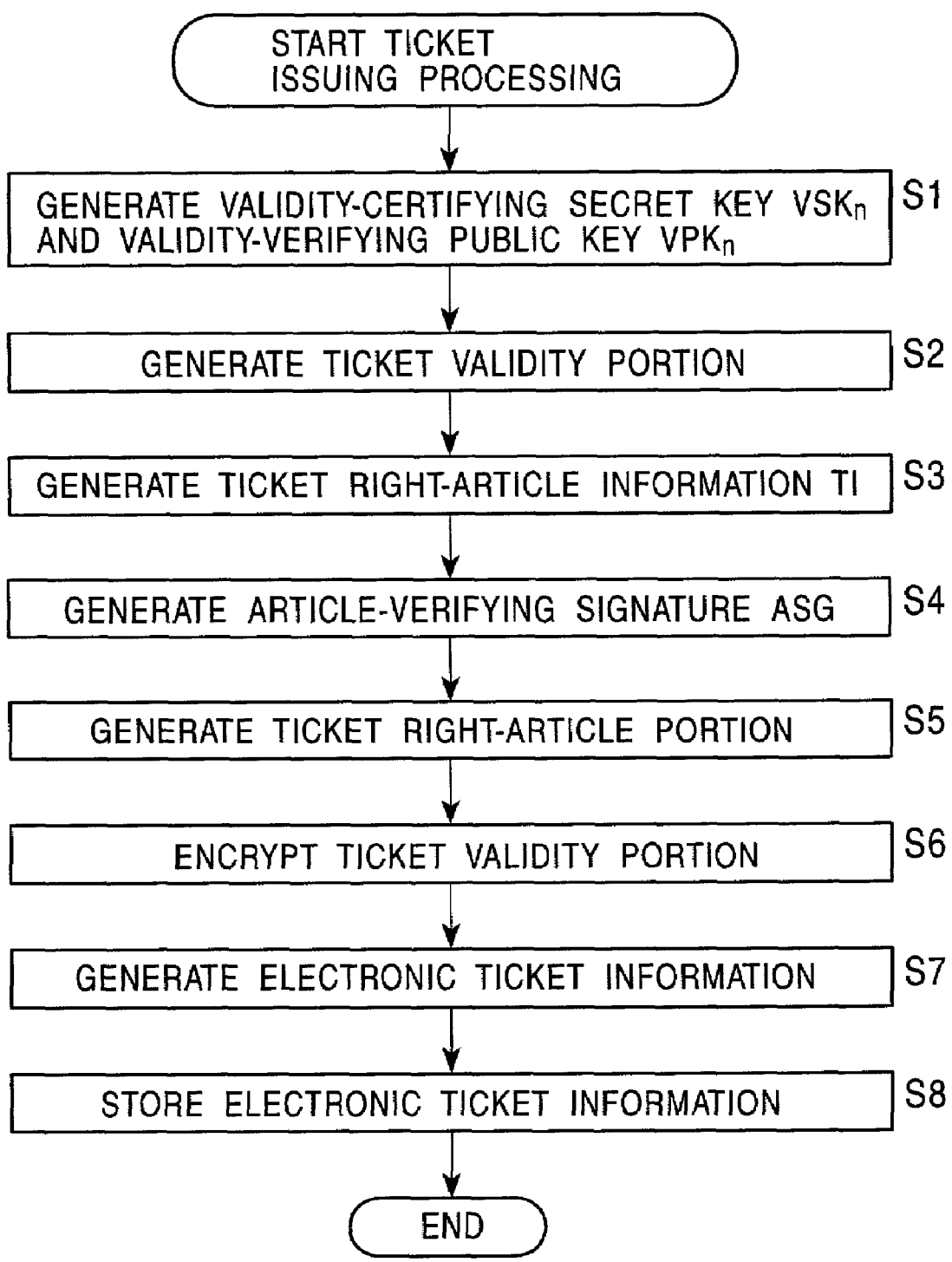
FIG. 6 is a flow chart illustrating the ticket issuing processing.

The ticket issuing device $3_T$ is able to issue a plurality of electronic tickets by repeatedly performing the ticket issuing processing shown in FIG. 6.

The electronic ticket stored in the ticket storage controller 18 is assigned to a ticket storage device $4_U$ (or the user thereof) according to the ticket assignment processing performed by the ticket storage controller 18, which is discussed below.

An electronic ticket may be issued by the ticket issuing device $3_T$ and is stored in the ticket storage controller 18 in advance. Then, upon receiving a request from the ticket storage device $4_U$, the electronic ticket is sent to the ticket storage device $4_U$. Alternatively, every time the ticket storage device $4_U$ makes a request, an electronic ticket may be issued and assigned.

Figure 7:
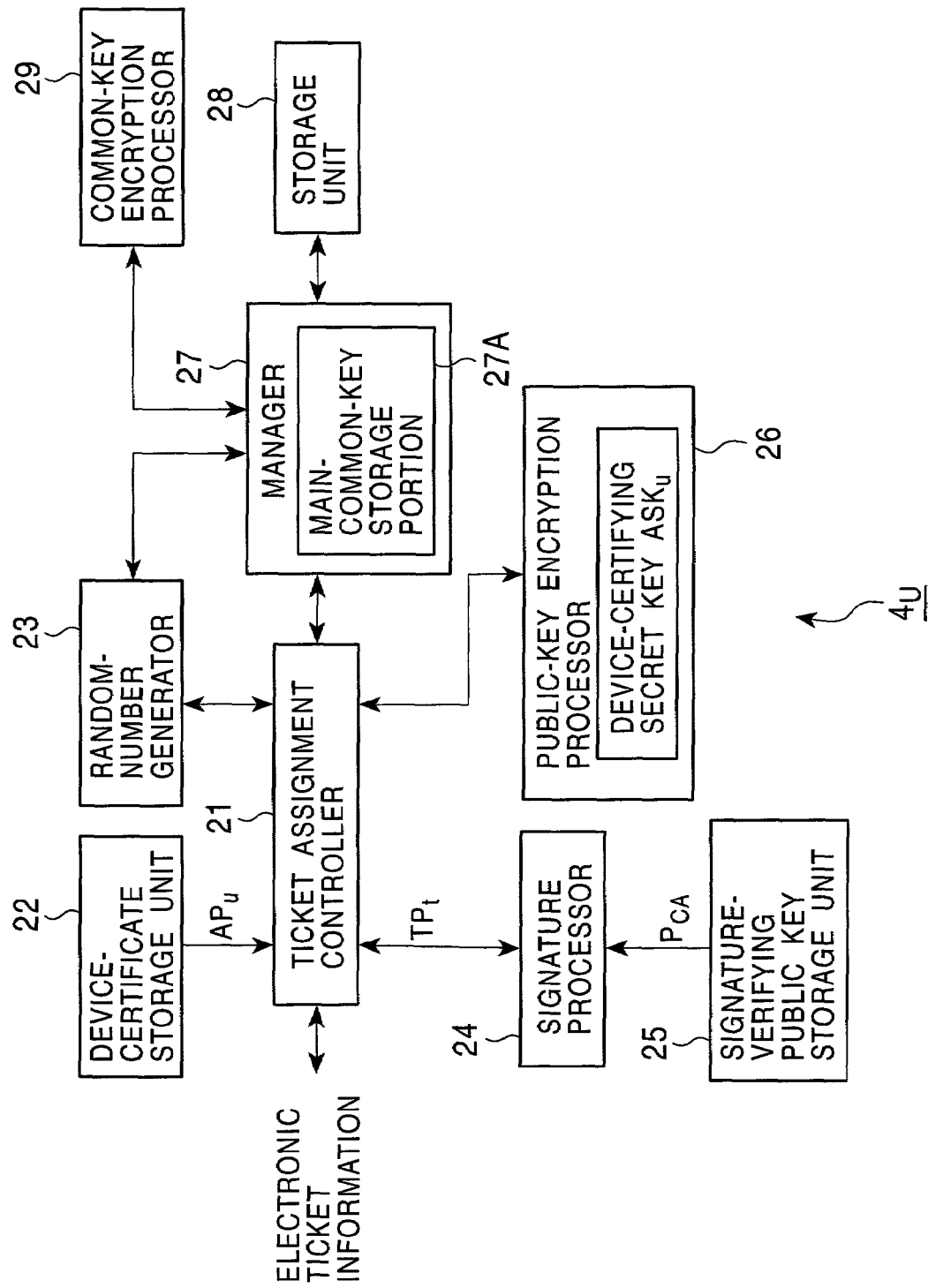
FIG. 7 is a block diagram illustrating the configuration of a ticket storage device shown in FIG. 1.

FIG. 7 is a block diagram illustrating the configuration of the ticket storage device $4_U$ shown in FIG. 1.

The ticket storage device $4_U$ has the functions of: assigning an electronic ticket to another storage device $4_{U'}$; receiving an electronic ticket from the ticket storage device $3_T$ or another storage device $4_{U'}$ by assignment; exercising the rights of an electronic ticket by sending the ticket right-article portion of the electronic ticket to the ticket checking device $5_S$; and discarding an electronic ticket.

A ticket assignment controller 21 controls the assignment of an electronic ticket from the ticket storage device $4_U$ to another ticket storage device $4_{U'}$ and vice versa. The ticket assignment controller 21 performs required control for performing processing discussed below while communicating with the other blocks of the ticket storage device $4_U$.

A device-certificate storage unit 22 stores the device certificate $AP_u$ issued by the ticket management center 1, which has been discussed with reference to FIG. 3, and supplies the device certificate $AP_u$ to the ticket assignment controller 21 under the control of the ticket assignment controller 21.

A random-number generator 23 generates random numbers under the control of the ticket assignment controller 21 or a manager 27, and supplies the random numbers to the ticket assignment controller 21 or the manger 27.

A signature processor 24 performs processing for a digital signature by using the signature-verifying public key $P_{CA}$ stored in a signature-verifying public key storage unit 25 according to the control of the ticket assignment controller 21.

The signature-verifying public key storage unit 25 acquires and stores the signature-verifying public key $P_{CA}$ publicized by the ticket management center 1, and supplies it to the signature processor 24.

A public-key encryption processor 26 has the device-certifying secret key $ASK_u$ corresponding to the device-verifying public key $APK_u$ registered in the ticket management center 1, and performs encryption processing and decryption processing according to a public key cryptosystem by using the device-certifying secret key $ASK_u$ under the control of the ticket assignment controller 21.

The manager 27 manages an electronic ticket stored in a storage unit 28 under the control of the ticket assignment controller 21. More specifically, the manager 27 manages the ticket validity portion of an electronic ticket stored in the storage unit 28 so as to prevent the ticket validity portion from being copied. Also, for sending and receiving an electronic ticket to and from another ticket storage device $4_{U'}$ (or from ticket issuing device $3_T$), the manager 27 transfers the electronic ticket while protecting the electronic ticket from being copied. When an electronic ticket stored in the storage unit 28 is assigned to another ticket storage device $4_{U'}$, the manager 27 reliably deletes the electronic ticket in the storage unit 28.

The manager 27 has a main-common-key storage portion 27A, which stores a main common key used for encrypting and decrypting data according to a common key cryptosystem.

The storage unit 28 is managed by the manager 27, and stores an electronic ticket and management information for managing the electronic ticket. The storage unit 28 may be formed of a memory or a hard disk (HD), which cannot be easily detached from the exterior, or a memory card, which can be easily detached from the exterior.

A common key encryption processor 29 performs encryption and decryption according to a common key cryptosystem under the control of the manager 27.

In the ticket storage device $4_U$, the device-certificate storage unit 22, the random-number generator 23, the signature processor 24, the public-key encryption processor 26, the manager 27, and the common key encryption processor 29 are tamper-proof.

Figure 8:
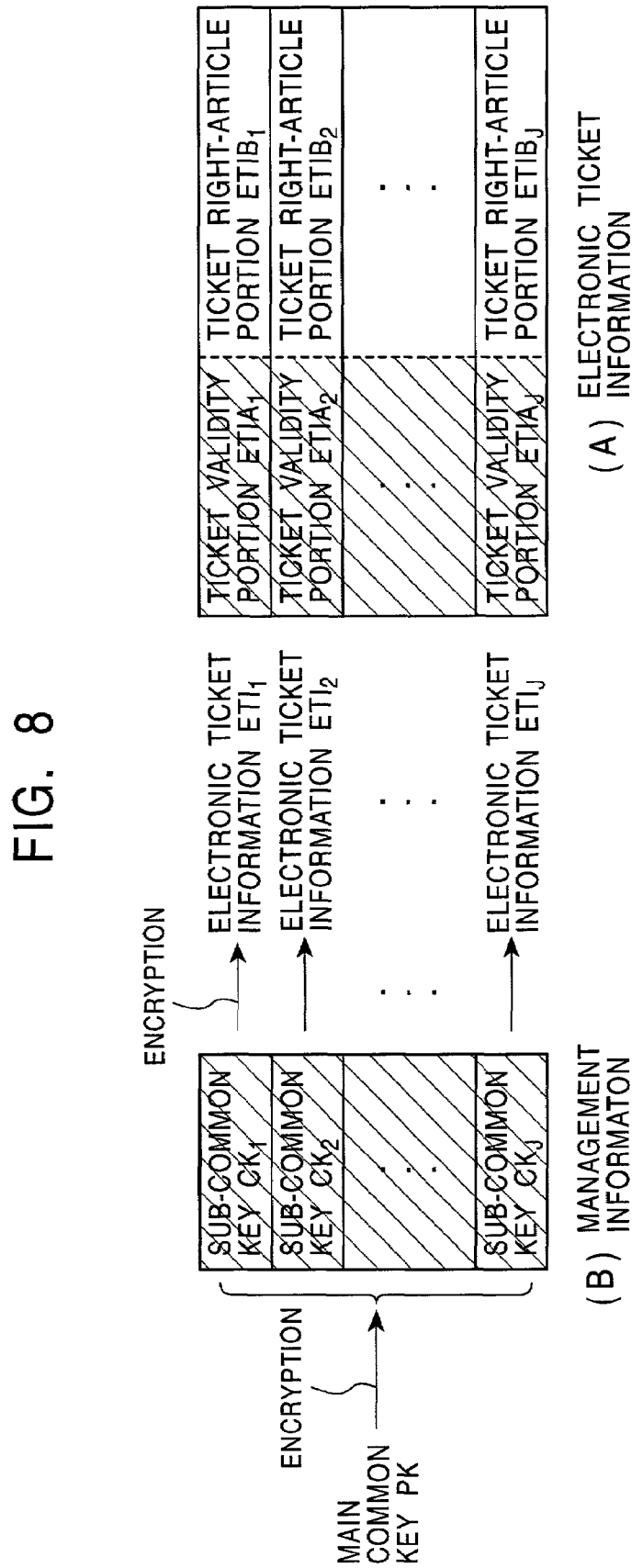
FIG. 8 illustrates the storage content of a storage unit shown in FIG. 7.

A description is now given of, with reference to FIG. 8, a management method for an electronic ticket stored in the storage unit 28 by the manager 27 shown in FIG. 7.

FIG. 8 illustrates the storage unit 28 in which J electronic tickets $ETI_1$ through $ETI_J$ are stored. In FIG. 8, the hatched portions are encrypted.

The manager 27 stores the electronic ticket $ETI_J$ including a ticket validity portion $ETIA_J$ and a ticket right-article portion $ETIB_J$ in the storage unit 28. In this case, the ticket right-article portion $ETIB_J$ is stored in the storage unit 28 in a manner similar to a file handled in a general-purpose computer, as indicated by (A) of FIG. 8.

The manager 27 encrypts the ticket validity portion $ETIA_J$ according to a common key cryptosystem with a common key unique to the corresponding electronic ticket, and stores the encrypted ticket validity portion $ETIA_J$ in the storage unit 28, as indicated by hatched portions in (A) of FIG. 8. Accordingly, the ticket validity portion $ETIA_J$ is stored in the storage unit 28 as a file format encrypted with a common key according to a common key cryptosystem.

The manager 27 also stores a sub-common key $CK_J$, as indicated by (B) of FIG. 8, for encrypting and decrypting the ticket validity portion $ETIA_J$ in the storage unit 28 as management information. In this case, the sub-common key $CK_J$ is encrypted with the main common key PK stored in the main-common-key storage portion 27A of the manager 27 according to a common key cryptosystem. As discussed above, the sub-common key $CK_J$ used for encrypting the ticket validity portion $ETIA_J$ is encrypted with the main common key PK and is stored in the storage unit 28.

The relationship between the ticket validity portion $ETIA_J$ and the ticket right-article portion $ETIB_J$ and the relationship between the ticket validity portion $ETIA_J$ and the sub-common key $CK_J$ may be included in the management information, or in the storage unit 28 as a separate file.

The main common key PK and the sub-common key $CK_J$, which serves as the management information, are updated with a predetermined timing. That is, the main common key PK is updated every time the sub-common key $CK_J$ is updated. The sub-common key $CK_J$ is updated every time the electronic ticket stored in the storage unit 28 is updated. A new main common key PK and a new sub-common key $CK_J$ are generated by random numbers, which is discussed in detail below.

As described above, in the storage unit 28, the ticket validity portion $ETIA_J$ is encrypted with the sub-common key $CK_J$ and is stored, and the sub-common key $CK_J$ is also encrypted with the main common key PK and is stored. Thus, it is possible to reliably prevent the leakage of the ticket validity portion $ETIA_J$ stored in the ticket storage device $4_U$.

A description is given below, with reference to the flow chart of FIG. 9, of the ticket assignment-receiving processing for receiving an electronic ticket by the ticket storage device $4_U$ shown in FIG. 7 by assignment from the ticket issuing device $3_T$ or another ticket storage device $4_{U'}$.

In this operation, it is assumed that the ticket storage device $4_U$ receives an electronic ticket from another ticket storage device $4_{U'}$. However, processing similar to the ticket assignment-receiving processing shown in FIG. 9 is performed when receiving an electronic ticket from the ticket issuing device $3_T$.

In step S11, authentication processing, which is discussed in detail below, is performed in an assignee, i.e., in the ticket storage device $4_U$. In step S12, the ticket assignment controller 21 determines whether the authentication has been successfully made. If the result of step S11 is no, the ticket assignment-receiving processing is terminated. That is, if the authentication has failed, it is determined that the assignor, i.e., the ticket storage device $4_{U'}$ is not legal, and thus, the ticket storage device $4_U$ refuses to receive an electronic ticket from the ticket storage device $4_{U'}$.

In contrast, if it is found in step S12 that the authentication has succeeded, i.e., that the assignor, i.e., the ticket storage device $4_{U'}$ is legal, the process proceeds to step S13. In step S13, the ticket storage device $4_{U'}$ sends the ticket right-article portion of an electronic ticket to be assigned, and the ticket assignment controller 21 of the ticket storage device $4_U$ receives the ticket right-article portion.

Then, in step S14, the ticket assignment controller 21 verifies the integrity of the ticket right-article portion received in step S13. Details of the processing in step S14 are given below. The ticket assignment controller 21 then determines in step S15 whether the integrity of the ticket right-article portion has been successfully verified. If the outcome of step S15 is no, the ticket assignment-receiving processing is terminated. That is, if the integrity of the ticket right-article portion is not verified, it is determined that the ticket right-article portion is tampered with, and the ticket storage device $4_U$ refuses to receive such a tampered electronic ticket.

If it is found in step S15 that the integrity of the ticket right-article portion has been successfully verified, the process proceeds to step S16. In step S16, the ticket storage device $4_{U'}$ sends the device certificate $AP_{u'}$ (FIG. 3), and the ticket assignment controller 21 receives it.

Then, in step S17, the ticket assignment controller 21 verifies the integrity of the device certificate $AP_{u'}$ received in step S16.

More specifically, the ticket assignment controller 21 supplies the device certificate $AP_{u'}$ to the signature processor 24, and controls the signature processor 24 to verify the digital signature $ASG_{u'}$ contained in the device certificate $AP_{u'}$.

In this case, the signature processor 24 encrypts the digital signature $ASG_{u'}$ with the signature-verifying public key $P_{CA}$ of the ticket management center 1 stored in the signature-verifying public key storage unit 25, and then determines whether the encryption result coincides with the device-verifying public key $APK_{u'}$ of the ticket storage device $4_{U'}$ contained in the device certificate $AP_{u'}$. The signature processor 24 then sends the determination result to the ticket assignment controller 21.

Then, in step S18, the ticket assignment controller 21 determines whether the integrity of the device certificate $AP_{u'}$ has been successfully verified based on the above-described determination result. If the result of step S18 is no, i.e., if the encryption result of the digital signature $ASG_{u'}$ contained in the device certificate $AP_{u'}$ with the signature-verifying public key $P_{CA}$ is not equal to the device-verifying public key $APK_{u'}$, the ticket assignment-receiving processing is terminated. In this case, it is determined that the digital signature $ASG_{u'}$ or the device-verifying public key $APK_{u'}$ is tampered with, and the ticket storage device $4_U$ refuses to receive the electronic ticket from the ticket storage device $4_{U'}$.

On the other hand, if it is found in step S18 that the integrity of the device certificate $AP_{u'}$ has been successfully verified, the process proceeds to step S19. In step S19, the ticket assignment controller 21 controls the random-number generator 23 to generate random numbers, and then generates an encryption key UK from the random numbers as a common key for encrypting and decrypting data according to a common key cryptosystem.

Thereafter, in step S20, the ticket assignment controller 21 supplies the encryption key UK and the device-verifying public key $APK_{u'}$ contained in the device certificate $AP_{u'}$ to the public-key encryption processor 26. The ticket assignment controller 21 controls the public-key encryption processor 26 encrypts the encryption key UK with the device-verifying public key $APK_{u'}$, so as to generate an encrypted encryption key $E(APK_{u'}, UK)$.

In step S21, the ticket assignment controller 21 sends the encrypted encryption key $E(APK_{u'}, UK)$ to the ticket storage device $4_{U'}$.

Then, in step S22, upon receiving the encrypted encryption key $E(APK_{u'}, UK)$, the ticket storage device $4_{U'}$ sends the ticket validity portion encrypted with the encryption key UK, and the ticket assignment controller 21 receives the encrypted ticket validity portion.

In step S23, the ticket assignment controller 21 determines whether the encrypted ticket validity portion has been successfully received in step S22. If the outcome of step S23 is no, the ticket assignment processing is terminated. In this case, the ticket assignment processing has failed.

If the outcome of step S23 is yes, the electronic ticket is added in the storage unit 28 in step S24. Details of the ticket addition processing in step S24 are given below. In this case, the ticket assignment processing has been successfully completed.

Figure 9:
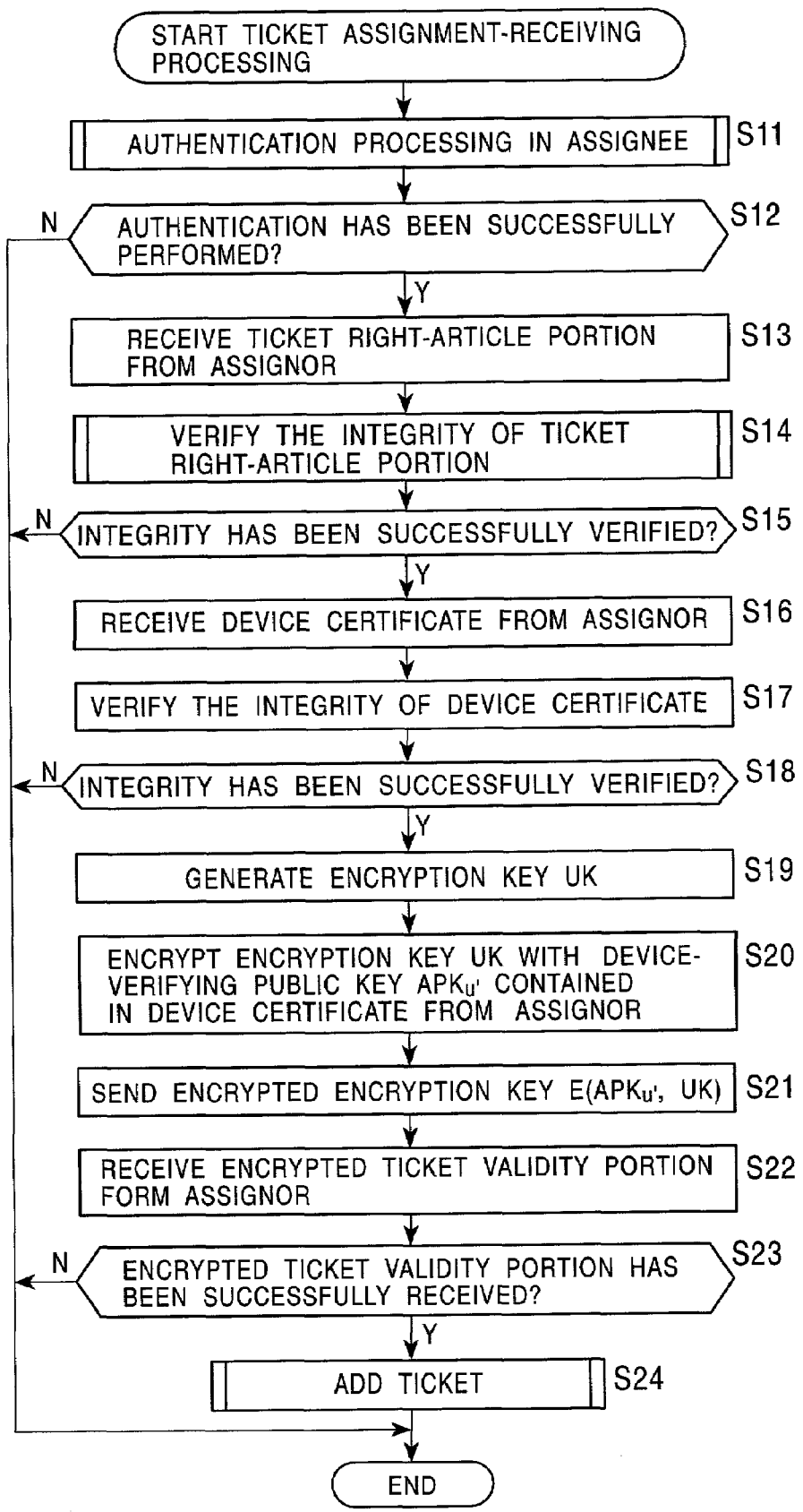
FIG. 9 is a flow chart illustrating the ticket assignment-receiving processing.

Details of the authentication processing in the assignee, i.e., the device storage device $4_U$ in step S11 of FIG. 9 are given below with reference to the flow chart of FIG. 10.

In step S31, the ticket assignment controller 21 reads the device certificate $AP_u$ stored in the device-certificate storage unit 22, and sends it to the ticket storage device $4_{U'}$ (assignor).

In step S32, the ticket storage device $4_{U'}$ sends encrypted random numbers $R=E(APK_u, r)$ obtained by encrypting the random numbers r with the device-verifying public key $APK_u$ contained in the device certificate $AP_u$, and the ticket assignment controller 21 receives the random numbers R.

Then, in step S33, the ticket assignment controller 21 supplies the encrypted random numbers R to the public-key encryption processor 26, and controls the public-key encryption processor 26 to decrypt the encrypted random numbers R with the device-certificate secret key $ASK_u$, thereby generating a decryption result $r'=D(ASK_u, R)$.

In step S34, the ticket assignment controller 21 sends the decryption result $r'=D(ASK_u, R)$ to the ticket storage device $4_{U'}$.

In step S35, the ticket storage device $4_{U'}$ performs authentication based on the decryption result r', and sends an authentication message indicating the authentication result to the ticket storage device $4_U$. Then, the ticket assignment controller 21 of the ticket storage device $4_U$ receives the authentication message and determines whether the authentication has been successfully performed in the ticket storage device $4_{U'}$.

If the outcome of step S35 is yes, the process proceeds to step S36 in which the ticket assignment controller 21 determines that the authentication has succeeded, and the authentication processing is completed. If the result of step S35 is no, the process proceeds to step S37, the ticket assignment controller 21 determines that the authentication has failed, and the authentication processing is completed.

Based on the determination result in step S36 or S37, the determination processing in step S12 of FIG. 9 is performed.

Figure 11:
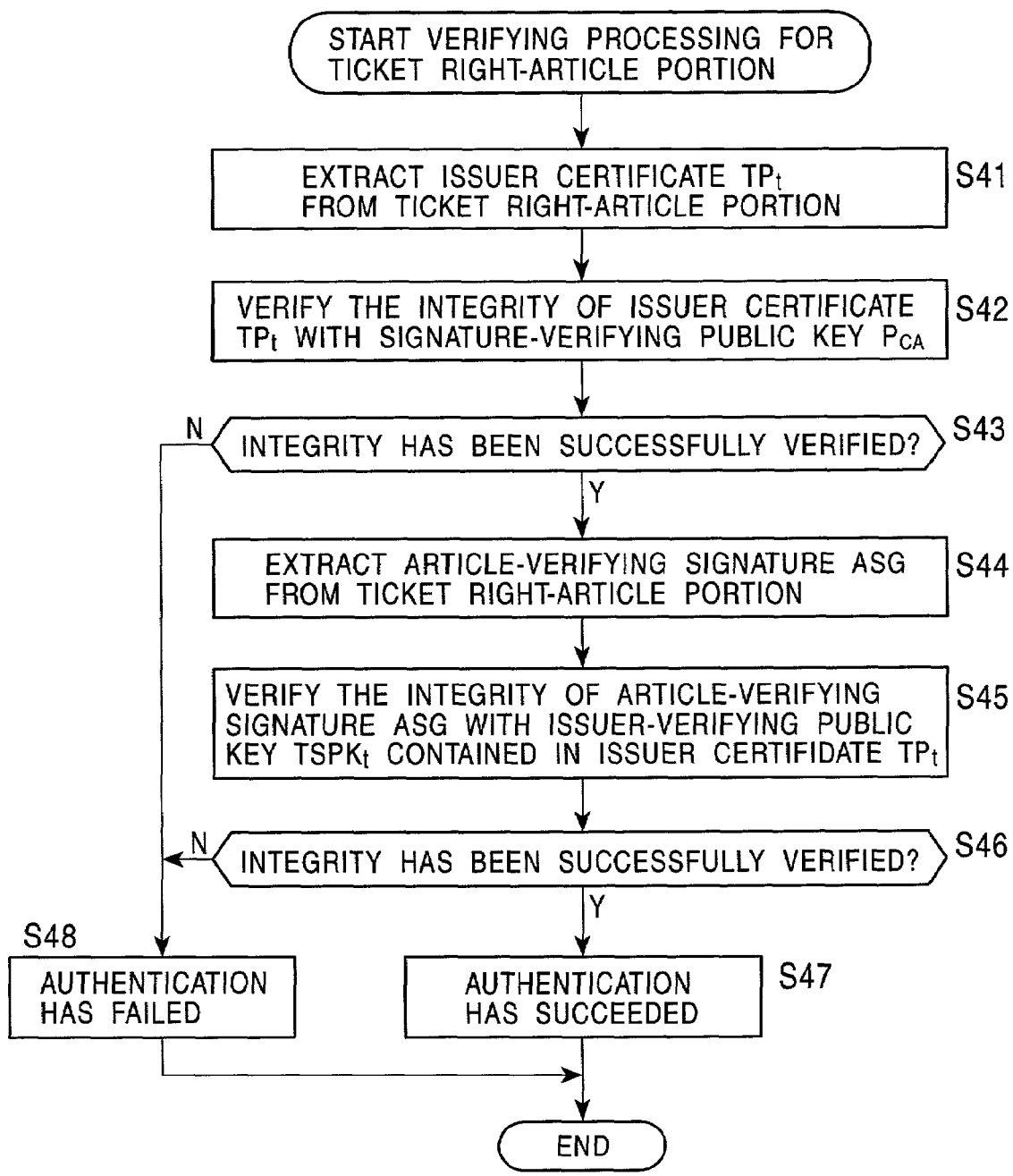
FIG. 11 is a flow chart illustrating the verifying processing for a ticket right-article portion.

Details of the verifying processing for the ticket right-article portion in step S14 of FIG. 9 are discussed below with reference to the flow chart of FIG. 11.

In step S41, the ticket assignment controller 21 extracts the issuer certificate $TP_t$ ((C) of FIG. 4) contained in the ticket right-article portion received from the ticket storage device $4_{U'}$ in step S13 of FIG. 9.

Then, in step S42, the ticket assignment controller 21 verifies the integrity of the issuer certificate $TP_t$ extracted in step S41. More specifically, the ticket assignment controller 21 supplies the issuer certificate $TP_t$ to the signature processor 24, and controls the signature processor 24 to verify the integrity of the digital signature $TSG_t$ contained in the issuer certificate $TP_t$.

In this case, the signature processor 24 encrypts the digital signature $TSG_t$ with the signature-verifying public key $P_{CA}$ of the ticket management center 1 stored in the signature-verifying public key storage unit 25. The signature processor 24 then determines whether the encryption result coincides with the issuer-identifying information $TID_t$ and the issuer-verifying public key $TSPK_t$ contained in the issuer certificate $TP_t$, and sends a determination result to the ticket assignment controller 21.

Then, in step S43, the ticket assignment controller 21 determines whether the integrity of the issuer certificate $TP_t$ has been successfully verified based on the determination result. If the outcome of step S43 is no, i.e., if the encryption result of the digital signature $TSG_t$ with the signature-verifying public key $P_{CA}$ is not equal to the issuer-identifying information $TID_t$ and the issuer-verifying public key $TSPK_t$, the process proceeds to step S48. In step S48, the ticket assignment controller 21 determines that the issuer certificate $TP_t$ is tampered with, i.e., that the authentication has failed, and the verifying processing for the ticket right-article portion is terminated.

If it is found in step S43 that the integrity of the issuer certificate $TP_t$ has been successfully verified, the process proceeds to step S44. In step S44, the ticket assignment controller 21 extracts the article-verifying signature ASG, the ticket right-article information TI, the validity-verifying public key $VPK_n$, and the issuer certificate $TP_t$ from the ticket right-article portion received in step S13 of FIG. 9, and also extracts the issuer-verifying public key $TSPK_t$ contained in the issuer certificate $TP_t$.

In step S45, the ticket assignment controller 21 verifies the integrity of the article-verifying signature ASG extracted in step S44. More specifically, the ticket assignment controller 21 supplies the article-verifying signature ASG, the ticket right-article information TI, the validity-verifying public key $VPK_t$, the issuer certificate $TP_t$, and the issuer-verifying public key $TSPK_t$ extracted in step S44 to the signature processor 24, and controls the signature processor 24 to verify the integrity of the article-verifying signature ASG.

In this case, the signature processor 24 encrypts the article-verifying signature ASG with the issuer-verifying public key $TSPK_t$, and determines whether the encryption result coincides with the ticket right-article information TI, the validity-verifying public key $VPK_t$, and the issuer certificate $TP_t$. The signature processor 24 then supplies a determination result to the ticket assignment controller 21.

In step S46, the ticket assignment controller 21 determines whether the ticket right-article portion received in step S13 of FIG. 9 is legal based on the determination result. If the outcome of step S46 is no, i.e., if the encryption result of the article-verifying signature ASG with the issuer-verifying public key $TSPK_t$ is not equal to the ticket right-article information TI, the validity-verifying public key $VPK_t$, and the issuer certificate $TP_t$, the process proceeds to step S48. In step S48, the ticket assignment controller 21 determines that the ticket right-article portion is tampered with, i.e., that the authentication has failed. Then, the verifying processing for the ticket right-article portion is completed.

If it is found in step S46 that the ticket right-article portion is legal, the process proceeds to step S47. In step S47, the ticket assignment controller 21 determines that the ticket right-article portion is not tampered with, i.e., that the authentication has succeeded. Then, the verifying processing for the ticket right-article portion is completed.

Based on the determination result in step S47 or S48, the determination processing in step S15 of FIG. 9 is performed.

Figure 12:
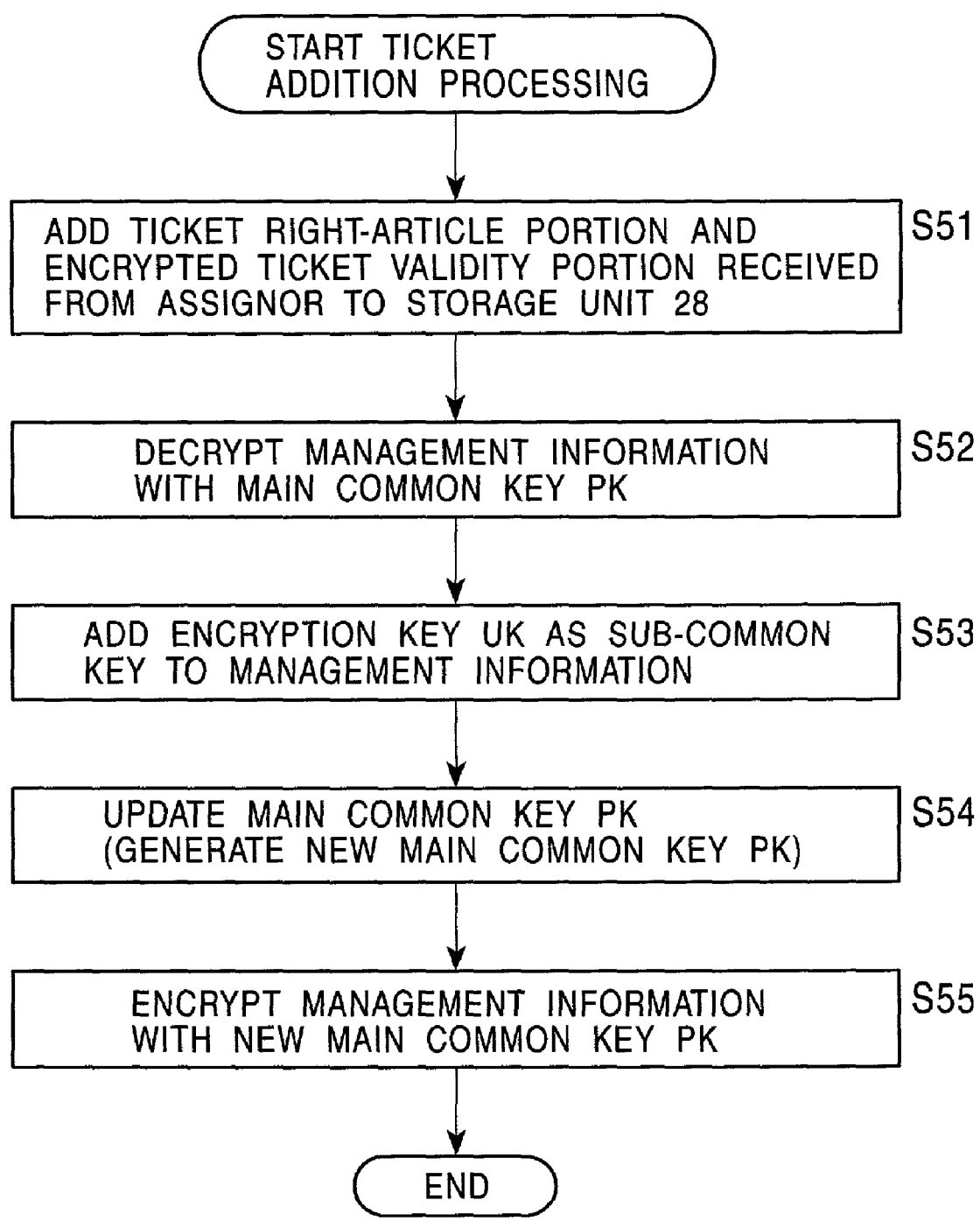
FIG. 12 is a flow chart illustrating the ticket addition processing.

A description is now given, with reference to the flow chart of FIG. 12, of details of the ticket addition processing in step S24 of FIG. 9.

In step S51, the ticket assignment controller 21 controls the manager 27 to add the ticket right-article portion received in step S13 of FIG. 9 and the encrypted ticket validity portion received in step S22 to the storage unit 28.

In step S52, the manager 27 reads the sub-common key $CK_j$ stored in the storage unit 28 as the encrypted management information, and also reads the main common key PK stored in the main-common-key storage portion 27A, and supplies these keys to the common-key encryption processor 29. The manager 27 then controls the common-key encryption processor 29 to decrypt the sub-common key $CK_j$ with the main common key PK.

Then, in step S53, the manager 27 acquires the encryption key UK generated in step S19 of FIG. 9 from the ticket assignment controller 21, and adds the encryption key UK to the management information read from the storage unit 28 as a new sub-common key.

In step S54, the manager 27 controls the random-number generator 23 to generate random numbers. The manager 27 then generates a new main common key PK from the random numbers, and updates the previous main common key stored in the main-common-key storage portion 27A with the new main common key PK.

Subsequently, in step S55, the manager 27 supplies the new main common key PK and the management information having the additional sub-common key UK (hereinafter referred to as the "new management information") to the common-key encryption processor 29. The manager 27 controls the common-key encryption processor 29 to encrypt the new management information with the new main common key PK and to overwrite the previous management information stored in the storage unit 28 with the new encrypted management information. Then, the ticket addition processing is completed.

The encrypted ticket validity portion stored in the storage unit 28 in step S51 has been encrypted in the ticket storage device $4_{U'}$ with the encryption key UK to be added to the management information as a new sub-common key (assignor). Thus, it is not necessary that the encrypted ticket validity portion be processed further in the ticket storage device $4_U$ (assignee) before being stored in the storage unit 28.

A description is given below, with reference to the flow chart of FIG. 13, of the ticket assigning processing performed when an electronic ticket is assigned from the ticket issuing device $3_T$ shown in FIG. 5 or the ticket storage device $4_U$ shown in FIG. 7 to another ticket storage device $4_{U''}$.

In this operation, it is assumed that an electronic ticket is assigned from the ticket storage device $4_U$. However, processing similar to the ticket assigning processing shown in FIG. 13 is performed by the ticket storage controller 18 when assigning an electronic ticket from the ticket issuing device $3_T$.

In the ticket assigning processing, the device-certifying secret key $ASK_u$, the device-verifying public key $APK_u$, and the device certificate $AP_u$ issued by the ticket management center 1 described with reference to FIG. 3 are required. Accordingly, if the ticket storage controller 18 of the ticket issuing device $3_T$ performs the ticket assigning processing, it is necessary that the ticket storage controller 18 possess the device-certifying secret key $ASK_u$, the device-verifying public key $APK_u$, and the device certificate $AP_u$.

In the ticket assigning processing, in step S61, the authentication processing, which is discussed in detail below, is performed in the assignor, i.e., in the ticket storage device $4_U$. In step S62, the ticket assignment controller 21 determines whether the authentication in step S61 has been successfully performed. If the outcome of step S61 is no, the ticket assigning processing is terminated. That is, if the authentication has failed, the ticket storage device $4_U$ (assignor) determines that the ticket storage device $4_{U''}$ (assignee) is illegal, and refuses to assign an electronic ticket to such an illegal ticket storage device $4_{U''}$.

If it is found in step S62 that the authentication has succeeded, the ticket storage device $4_U$ determines that the ticket storage device $4_{U''}$ is legal. Then, in step S63, the ticket assignment controller 21 controls the manager 27 to read the ticket right-article portion of an electronic ticket to be assigned from the storage device 28, and sends the ticket right-article portion to the ticket storage device $4_{U''}$.

In step S64, the ticket assignment controller 21 reads the device certificate $AP_u$ from the device-certificate storage unit 22, and sends it to the ticket storage device $4_{U''}$.

In the ticket storage device $4_{U''}$, the above-described ticket assignment-receiving processing (FIG. 9) is performed. When the integrity of the ticket right-article portion sent in step S63 and that of the device certificate $AP_u$ sent in step S64 are verified, the device storage device $4_{U''}$ sends the encrypted encryption key $E(APK_u, UK)$, which is similar to the encrypted encryption key $E(APK_u, UK)$ discussed in step S21 of the ticket assignment-receiveing processing of FIG. 9. Accordingly, in step S65, the ticket assignment controller 21 receives the encrypted encryption key E(APK$_u$,UK).

Then, in step S66, the ticket assignment controller 21 decrypts the encrypted encryption key E(APK$_u$,UK) received in step S65. More specifically, the encrypted encryption key E(APK$_u$,UK) has been obtained by the ticket storage device 4$_{U'}$ by encrypting the encryption key UK with the device-verifying public key APK$_u$ contained in the device certificate AP$_u$ sent to the ticket storage device 4$_{U'}$ (assignee) in step S64. Thus, the encrypted encryption key E(APK$_u$,UK) can be decrypted with the device-certifying secret key ASK$_u$ stored in the public-key encryption processor 26.

Then, in step S66, the ticket assignment controller 21 supplies the encrypted encryption key E(APK$_u$,UK) to the public-key encryption processor 26, and controls the public-key encryption processor 26 to decrypt the encrypted encryption key E(APK$_u$,UK) to the encryption key UK by using the device-certifying secret key ASK$_u$.

In step S67, the ticket assignment controller 21 controls the manager 27 to decrypt the encrypted ticket validity portion of the electronic ticket to be assigned stored in the storage unit 28.

More specifically, the manager 27 reads the main common key PK stored in the main-common-key storage portion 27A and also reads the encrypted management information stored in the storage unit 28, and supplies them to the common-key encryption processor 29. The common-key encryption processor 29 decrypts the management information with the main common key PK, and extracts the sub-common key CK$_j$ used for encrypting the ticket validity portion of the electronic ticket to be assigned from the decrypted management information.

Thereafter, the manager 27 reads the encrypted ticket validity portion from the storage unit 28 and supplies it to the common-key encryption processor 29. The common-key encryption processor 29 decrypts the ticket validity portion with the sub-common key CK$_j$ extracted from the management information.

In step S68, the ticket assignment controller 21 supplies the encryption key UK decrypted in step S66 to the manager 27, and requests the manager 27 to encrypt the ticket validity portion with the encryption key UK. In this case, the manager 27 further supplies the encryption key UK to the common-key encryption processor 29 and controls the common-key encryption processor 29 to encrypt the ticket validity portion decrypted in step S67 with the encryption key UK.

The encrypted ticket validity portion is then supplied to the ticket assignment controller 21 via the manager 27. In step S69, the ticket assignment controller 21 sends the encrypted ticket validity portion to the ticket storage device 4$_{U'}$ (assignee).

In step S70, the electronic ticket assigned to the ticket storage device 4$_{U'}$ is deleted from the storage unit 28. Details of the ticket deletion processing in step S70 are given below. Then, the ticket assigning processing is completed.

Figure 13:
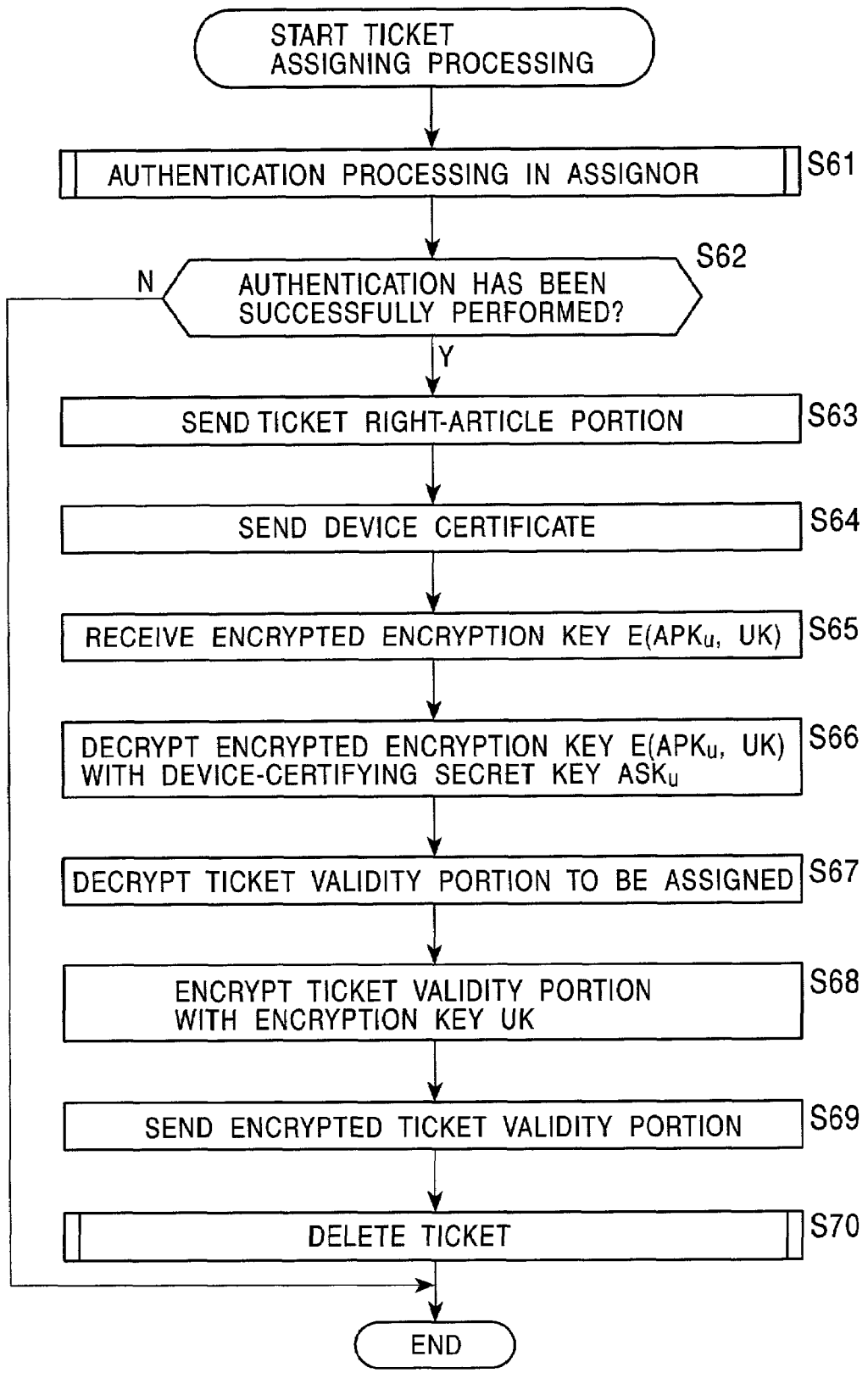
FIG. 13 is a flow chart illustrating the ticket assigning processing.
Figure 14:
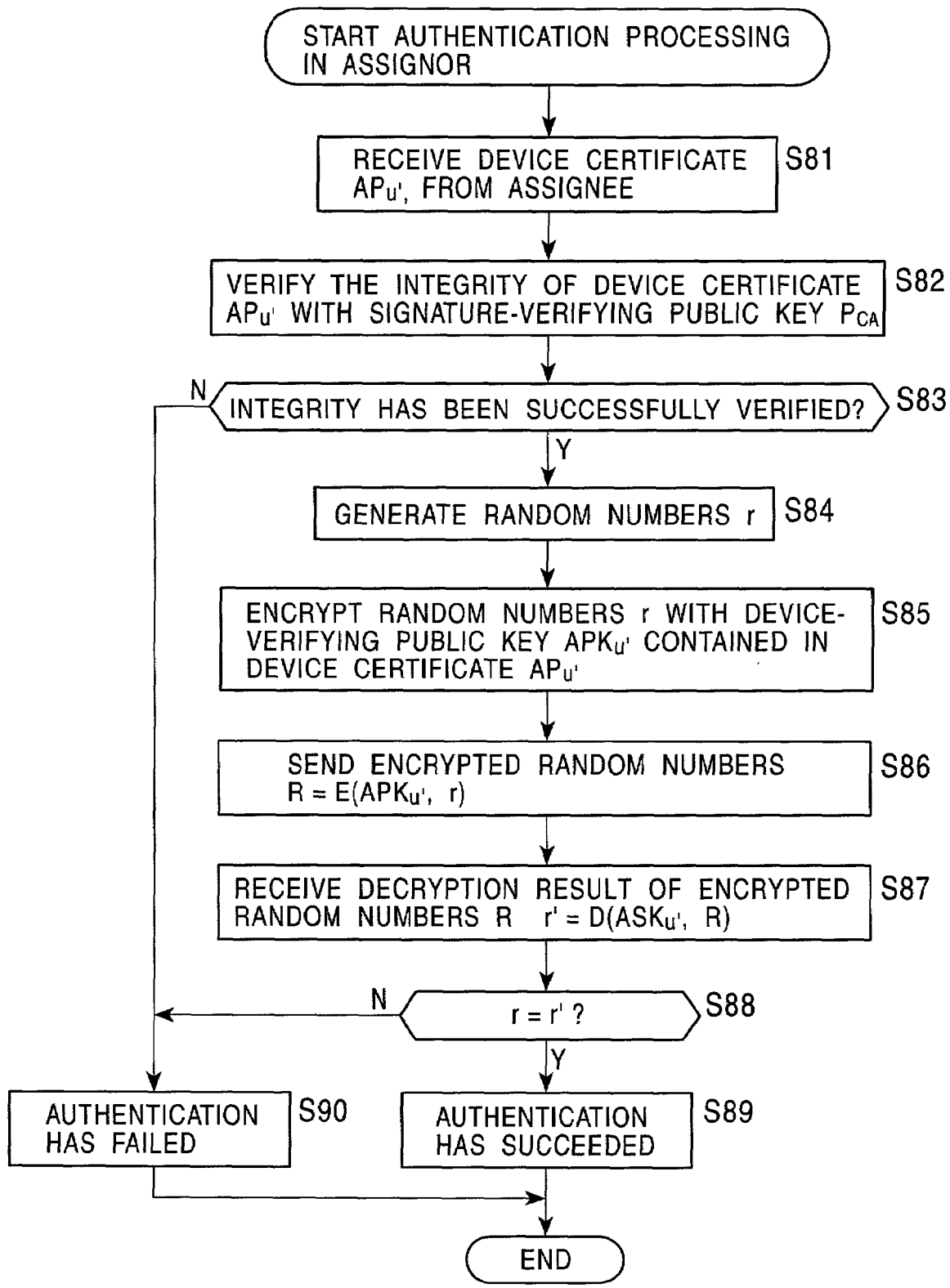
FIG. 14 is a flow chart illustrating the authentication processing in an assignor.

Details of the authentication processing in the assignor in step S61 of FIG. 13 are given below with reference to the flow chart of FIG. 14.

Figure 10:
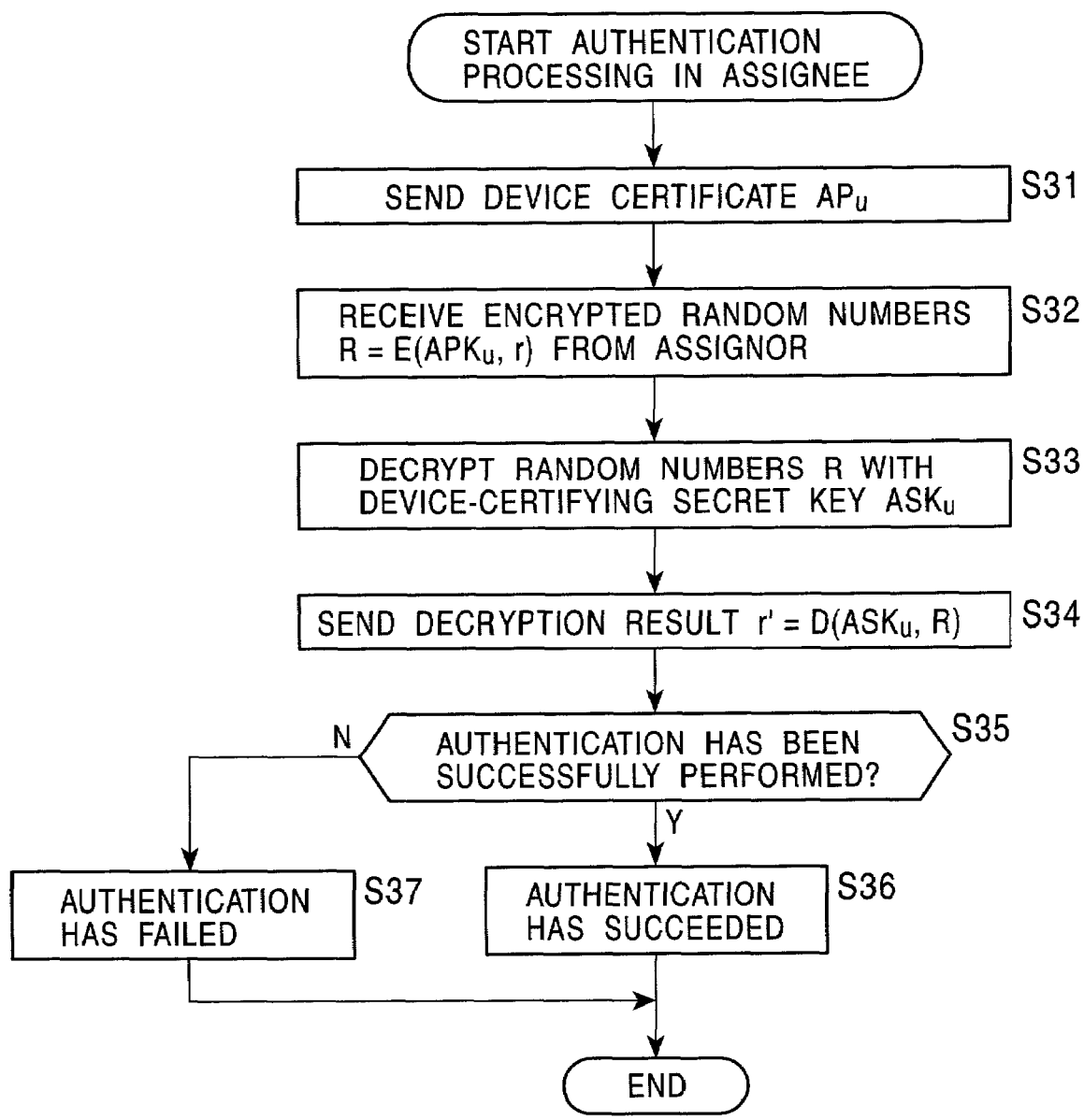
FIG. 10 is a flow chart illustrating the authentication processing in an assignee.

In step S81, the ticket assignment controller 21 receives the device certificate AP$_{u'}$ from the ticket storage device 4$_{U'}$ (assignee), which is similar to the device certificate AP$_u$ sent in step S31 of FIG. 10.

In step S82, the ticket assignment controller 21 verifies the integrity of the device certificate AP$_{u'}$ received in step S81. More specifically, the ticket assignment controller 21 supplies the device certificate AP$_{u'}$ to the signature processor 24, and controls the signature processor 24 to verify the integrity of the digital signature ASG$_{u'}$ contained in the device certificate AP$_{u'}$.

In this case, the device signature 24 encrypts the digital signature ASG$_{u'}$ with the signature-verifying public key P$_{CA}$ of the ticket management center 1 stored in the signature-verifying public key storage unit 25. The device signature 24 then determines whether the encryption result coincides with the device-verifying public key APK$_{u'}$ contained in the device certificate AP$_{u'}$, and supplies a determination result to the ticket assignment controller 21.

In step S83, the ticket assignment controller 21 determines whether the integrity of the device certificate AP$_{u'}$ has been successfully verified based on the determination result. If the outcome of step S83 is no, that is, if the encryption result of the digital signature ASG$_{u'}$ contained in the device certificate AP$_{u'}$ with the signature-verifying public key P$_{CA}$ is not equal to the device-verifying public key APK$_{u'}$, the process proceeds to step S90. In step S90, the ticket assignment controller 21 determines that the authentication has failed, and sends a corresponding authentication message to the ticket storage device 4$_{U'}$ (assignee). Then, the authentication processing in the assignor is completed.

If it is found in step S83 that the integrity of the device certificate AP$_{u'}$ has been successfully performed, the process proceeds to step S84 in which the ticket assignment controller 21 controls the random-number generator 23 to generate the random numbers r.

In step S85, the ticket assignment controller 21 extracts the device-verifying public key APK$_{u'}$ contained in the device certificate AP$_{u'}$, and supplies the device-verifying public key APK$_{u'}$ with the random numbers r to the public-key encryption processor 26. Then, the ticket assignment controller 21 controls the public-key encryption processor 26 to encrypt the random numbers r with the device-verifying public key APK$_{u'}$, thereby generating encrypted random numbers R=E(APK$_{u'}$,r).

Then, in step S86, the ticket assignment controller 21 sends the encrypted random numbers R=E(APK$_{u'}$,r) to the ticket storage device 4$_{U'}$.

Upon receiving the encrypted random numbers R=E(APK$_{u'}$,r), the ticket storage device 4$_{U'}$ decrypts the encrypted random numbers R=E(APK$_{u'}$,r) with the device-certifying secret key ASK$_{u'}$ discussed in step S33 of FIG. 10, and sends a decryption result r'=D(ASK$_{u'}$,R) discussed in step S34 of FIG. 10. Then, in step S87, the ticket assignment controller 21 receives the decryption result r'=D(ASK$_{u'}$,R).

In step S88, the ticket assignment controller 21 determines whether the random numbers r generated in step S84 coincide with the decryption result r' received in step S87. If the outcome of step S88 is no, the process proceeds to step S90. In step S90, the ticket assignment controller 21 determines that the ticket storage device 4$_{U'}$ (assignee) is not a device registered in the ticket management center 1, i.e., that the authentication has failed, and sends a corresponding authentication message to the ticket storage device 4$_{U'}$. Then, the authentication processing in the assignor is completed.

If it is found in step S88 that the random numbers r are equal to the decryption result r', the process proceeds to step S89. In step S89, the ticket assignment controller 21 determines that the ticket storage device 4$_{U'}$ is a device registered in the ticket management center 1, i.e., that the authentication has succeeded, and sends a corresponding authentication message to the ticket storage device $4_{U'}$ (assignee). The authentication processing in the assignor is then completed.

Based on the determination result in step S89 or S90, the determination processing in step S62 of FIG. 13 is performed.

Details of the ticket deletion processing in step S70 shown in FIG. 13 are given below with reference to the flow chart of FIG. 15.

In step S101, the manager 27 reads the encrypted management information from the storage unit 28, and also reads the main common key PK from the main-common-key storage portion 27A, and supplies these keys to the common-key encryption processor 29. The manager 27 then controls the common-key encryption processor 29 to decrypt the management information with the main common key PK.

Then, in step S102, the manager 27 deletes the sub-common key $CK_J$ used for encrypting the ticket validity portion of the electronic ticket to be deleted from the management information decrypted in step S101.

In this example, the electronic ticket to be deleted is a ticket assigned to another ticket storage device.

In step S103, the manager 27 controls the random-number generator 23 to generate random numbers. The manager 27 then generates a new main common key PK from the random numbers, and updates the previous main common key stored in the main-common-key storage portion 27A with the new main common key PK.

In step S104, the manager 27 supplies the management information obtained in step S102 and the new main common key PK obtained in step S103 to the common-key encryption processor 29, and controls the common-key encryption processor 29 to encrypt the management information with the new main common key PK, thereby generating new encrypted management information. The manager 27 then overwrites the previous management information in the storage unit 28 with the new encrypted management information.

Then, in step S105, the manager 27 deletes the encrypted ticket validity portion and the ticket right-article portion, which form the electronic ticket, from the storage unit 28. The ticket deletion processing is then completed.

Figure 15:
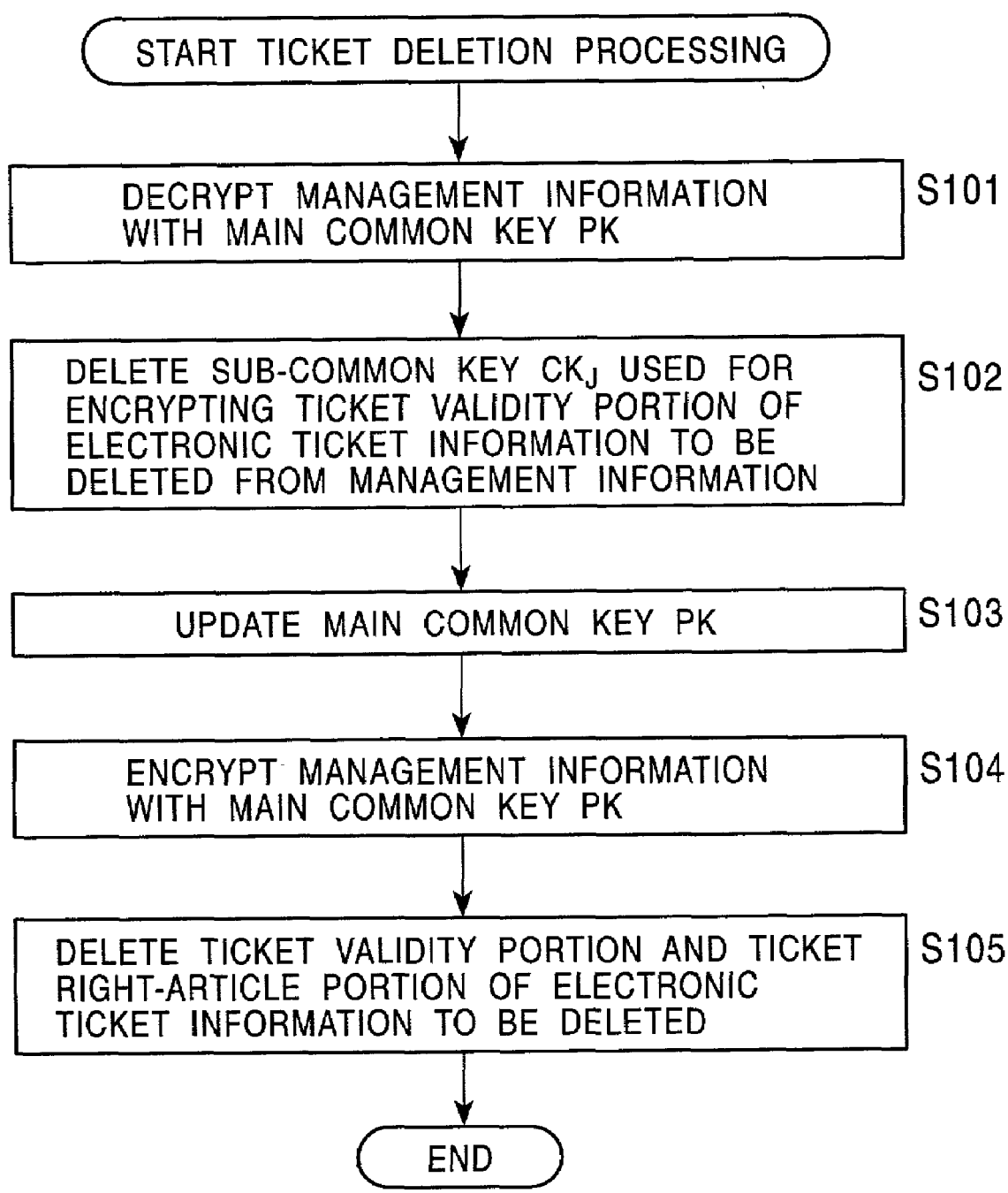
FIG. 15 is a flow chart illustrating the ticket deletion processing.

The ticket deletion processing shown in FIG. 15 is performed not only when an electronic ticket is assigned, but also when the effective period expires or the limited number of uses is exceeded, which can be identified by the description of the ticket right-article portion of the electronic ticket or a tacit assumption, or when an unnecessary ticket is deleted by an owner's will.

A description is given below, with reference to FIG. 16, of the ticket right-exercising/validating processing performed by the ticket storage device $4_U$ shown in FIG. 7 to exercise or prove the validity of the rights of an electronic ticket to the ticket checking device $5_S$.

For convenience, when exercising the rights of an electronic ticket with a limited number of uses, validating the rights associated with an electronic ticket containing the number of uses and causing the number of uses to be increased by one is referred to as "exercising the rights". In contrast, when simply proving the possession of an electronic ticket, verifying only the validity of an electronic ticket or exercising the rights of an electronic -ticket without a limited number of uses (may be provided with an effective period or a designated date) is referred to as "validating the rights".

For example, if an electronic ticket is a coupon ticket, passing through a ticket gate with the coupon ticket is exercising the rights. If an electronic ticket is a commuter ticket, passing through a ticket gate is validating the rights. If an electronic ticket is a train ticket or a special express ticket, presenting the ticket is also validating the rights. When an electronic ticket is assigned, verifying the validity of the electronic ticket to be sent or received is also validating the rights.

In the ticket right-exercising/validating processing, the user first selects an electronic ticket from the electronic tickets stored in the storage unit 28 of the ticket storage device $4_U$. Such an electronic ticket is hereinafter referred to as a "selected electronic ticket".

In step S111, the ticket assignment controller 21 controls the manager 27 to read the ticket right-article portion of the selected ticket from the storage unit 28. The ticket assignment controller 21 then sends the ticket right-article portion to the ticket checking device $5_S$ (verifier).

In step S112, upon receiving the ticket right-article portion, the ticket checking device $5_S$ generates and sends the random numbers r, and the ticket assignment controller 21 receives the random numbers r.

In step S113, the manager 27 reads the encrypted management information stored in the storage unit 28 and also reads the main common key PK stored in the main-common-key storage portion 27A, and supplies these keys to the common-key encryption processor 29. The manager 27 then controls the common-key encryption processor 29 to decrypt the encrypted management information with the main common key PK.

Then, in step S114, the manager 27 extracts the sub-common key $CK_J$ used for encrypting the ticket validity portion of the selected ticket from the decrypted management information.

In step S115, the manager 27 reads the ticket validity portion of the selected electronic ticket from the storage unit 28, and supplies the ticket validity portion together with the sub common key $CK_J$ obtained in step S114 to the common-key encryption processor 29. The manager 27 then controls the common-key encryption processor 29 to decrypt the encrypted ticket validity portion with the sub-common key $CK_J$.

More specifically, the common-key encryption processor 29 decrypts the ticket validity portion with the sub-common key $CK_J$, and supplies the decrypted ticket validity portion to the ticket assignment controller 21 via the manager 27.

Thereafter, in step S116, the ticket assignment controller 21 determines whether the rights of the selected electronic ticket are provided with a limited number of uses (hereinafter referred to as "restricted rights") by referring to the ticket right-article information TI contained in the ticket right-article portion sent to the ticket checking device $5_S$ in step S111.

If the outcome of step S116 is no, the process proceeds to step S117. In step S117, the ticket assignment controller 21 supplies the random numbers r received from the ticket checking device $5_S$ in step S112 and the validity-certifying secret key $VSK_n$ contained in the ticket validity portion of the selected electronic ticket obtained in step S115 to the signature processor 24. The ticket assignment controller 21 then controls the signature processor 24 to generate a digital signature SG(r) for the random numbers r.

More specifically, the signature processor 24 decrypts the one-way hash function h(r) of the random numbers r with the validity-certifying secret key $VSK_n$, thereby generating a digital signature $SG(r)=D(VSK_n,h(r))$. The signature processor 24 then supplies the digital signature SG(r) to the ticket assignment controller 21 as the right-validating signature for validating the presence of the validity-certifying secret key $VSK_n$.

In step S118, the ticket assignment controller 21 sends the received right-validating signature SG(r) to the ticket checking device $5_S$.

If it is found in step S116 that the rights of the selected electronic ticket are provided with a limited number of uses, the process proceeds to step S119. A determination is then made in step S119 as to whether the rights are to be validated. This determination is made by, for example, the user's operation on the ticket storage device $4_U$. If the outcome of step S119 is yes, i.e., if the selected electronic ticket is, for example, a train ticket, which is presented to a train conductor for validating the presence of the train ticket, the process proceeds to step S120. In step S120, the ticket assignment controller 21 supplies the random numbers r received from the ticket checking device $5_S$ in step S112 and the validity-certifying secret key $VSK_n$ and the additional information contained in the ticket validity portion of the selected electronic ticket obtained in step S115 to the signature processor 24. The ticket assignment controller 21 then controls the signature processor 24 to generate a digital signature SG(r,c) for the random numbers r and the number of uses c contained in the additional information.

More specifically, the signature processor 24 decrypts the one-way hash function h(r,c) of the random numbers r and the number of uses c contained in the additional information by using the validity-certifying secret key $VSK_n$, thereby generating a digital signature SG(r,c)=D($VSK_n$,h(r,c)) for the random numbers r and the number of uses c. The signature processor 24 then supplies the digital signature SG(r,c) to the ticket assignment controller 21 as the right-validating signature for verifying the presence of the validity of the selected electronic ticket.

Then, in step S121, the ticket assignment controller 21 sends the received right-validating signature SG(r,c) together with the number of uses c contained in the additional information of the ticket validity portion to the ticket checking device $5_S$.

If it is found in step S119 that the rights of the selected electronic ticket are not to be validated, this means that the rights are to be exercised. For example, the selected electronic ticket is a train ticket or a coupon ticket, with which the user attempts to pass through a ticket gate. Then, the process proceeds to step S122. In step S122, the ticket assignment controller 21 supplies the random numbers r received from the ticket checking device $5_S$ in step S112 and the validity-certifying secret key $VSK_n$ and the additional information contained in the ticket validity portion obtained in step S115 to the signature processor 24. The ticket assignment controller 21 also supplies exercise code e indicating that the rights are to be exercised to the signature processor 24. The exercise code e is predetermined, for example, between the ticket storage device $4_U$ and the ticket checking device $5_S$.

In step S122, the ticket assignment controller 21 controls the signature processor 24 to generate a digital signature SG(r,c,e) for the random numbers r, the number of uses c contained in the additional information, and the exercise code e.

More specifically, the signature processor 24 decrypts the one-way hash function h(r,c,e) of the random numbers r, the number of uses c, and the exercise code e with the validity-certifying secret key $VSK_n$, thereby generating a digital signature SG(r,c,e)=D($VSK_n$,h(r,c,e)). The signature processor 24 then supplies the digital signature SG(r,c,e) to the ticket assignment controller 21 as the right-validating signature for validating the presence of the validity of the selected electronic ticket.

In step S123, the ticket assignment controller 21 sends the received right-validating signature SG(r,c,e) together with the number of uses c contained in the additional information of the ticket validity portion to the ticket checking device $5_S$.

Then, in step S124, the ticket assignment controller 21 increments the number of uses c by one.

In step S125, the manager 27 updates the sub-common key $CK_J$ extracted from the management information in step S114. More specifically, the manager 27 controls the random-number generator 23 to generate random numbers. The manager 27 then generates a new sub-common key $CK'_J$ from the random numbers, and overwrites the previous sub-common key $CK_J$ of the management information with the new sub-common key $CK'_J$, thereby generating new management information.

Subsequently, in step S126, the manager 27 obtains the ticket validity portion (the number of uses c contained in the additional information of the ticket validity portion may be updated in step S124) of the selected electronic ticket from the ticket assignment controller 21, and supplies the ticket validity portion and the new sub-common key $CK'_J$ to the common-key encryption processor 29. The common-key encryption processor 29 then encrypts the ticket validity portion with the new sub-common key $CK'_J$, and supplies the encrypted ticket validity portion to the manager 27.

In step S126, the manager 27 overwrites the ticket validity portion stored in the storage unit 28 with the encrypted ticket validity portion supplied from the common-key encryption processor 29.

Then, in step S127, the manager 27 controls the random-number generator 23 to generate random numbers, and generates a new main common key PK, thereby updating the previous main common key PK in the main-common-key storage portion 27A with the new main common key PK.

Subsequently, in step S128, the manager 27 supplies the new main common key PK obtained in step S127 and the new management information obtained in step S125 to the common-key encryption processor 29, and controls the common-key encryption processor 29 to encrypt the new management information with the new main common key PK. The manager 27 also overwrites the previous management information in the storage unit 28 with the new management information. Then, the ticket right-exercising/validating processing is completed.

Figure 17:
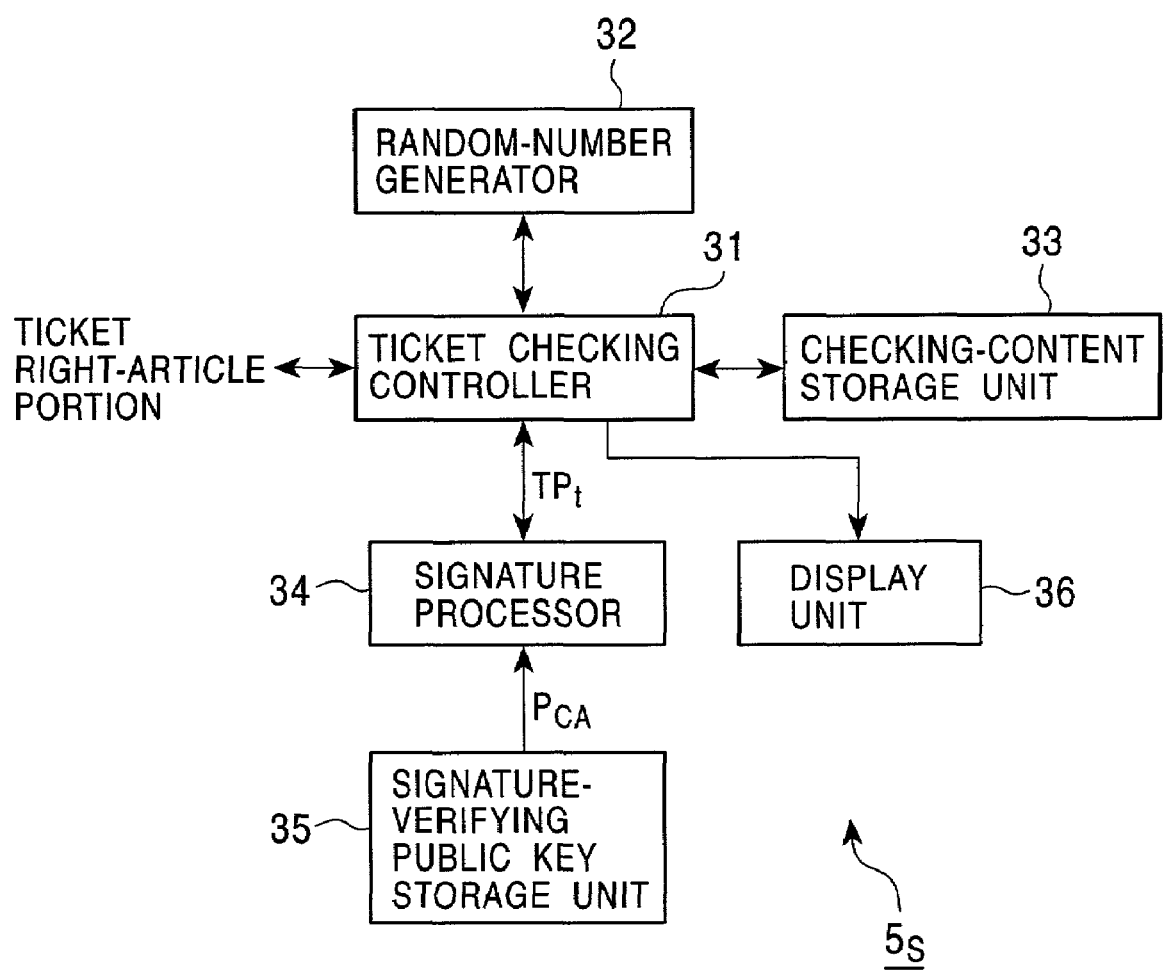
FIG. 17 is a block diagram illustrating the configuration of the ticket checking device shown in FIG. 1.

FIG. 17 is a block diagram illustrating the configuration of the ticket checking device $5_S$ shown in FIG.

The ticket checking device $5_S$ has the functions of checking an electronic ticket when the rights associated with the electronic ticket are to be exercised or when they are being exercised. More specifically, the ticket checking device $5_S$ has the functions of receiving the ticket right-article portion, which forms an electronic ticket, from the ticket storage device $4_U$, and checking the validity of the ticket right-article portion. The ticket checking device $5_S$ also has the function of verifying that the ticket storage device $4_U$ possesses the ticket validity portion according to the challenge and response authentication technique.

Since the ticket checking device $5_S$ has the function of checking an electronic ticket, as discussed above, it can be used for checking whether an electronic ticket to be assigned from another user is valid before or after the electronic ticket is assigned. The ticket checking device $5_S$, which is described below, may be integrated into the ticket storage device $4_U$.

A ticket checking controller 31 performs a control operation required for checking an electronic ticket stored in the ticket storage device $4_U$ while communicating with the other blocks of the ticket checking device $5_S$. Details of the ticket checking processing are given below.

A random-number generator 32 generates random numbers under the control of the ticket checking controller 31, and supplies the random numbers to the ticket checking controller 31.

A checking-content storage unit 33 stores conditions required for providing services (hereinafter referred to as "service conditions") by the service provider which owns the ticket checking device $5_S$. If the service provider provides services for an event, and the ticket checking device $5_S$ checks the passage of users into an event venue, the time and date, the place, and the name of the event, etc., can be service conditions. The provision of the checking-content storage unit 33 may be omitted according to the purpose of use for the ticket checking device $5_S$. If the checking-content storage unit 33 is not provided, it is assumed that service conditions are not set.

A signature processor 34 processes a digital signature by using the signature-verifying public key $P_{CA}$ stored in a signature-verifying public key storage unit 35 under the control of the ticket checking controller 31.

The signature-verifying public key storage unit 35 obtains the signature-verifying public key $P_{CA}$ publicized by the ticket management center 1 in advance, and supplies it to the signature processor 34.

A display unit 36 displays the validity or the content of an electronic ticket to be checked under the control of the ticket checking controller 31. As the checking-content storage unit 33, the display unit 36 may be omitted according to the purpose of use for the ticket checking device $5_S$.

Figure 18:
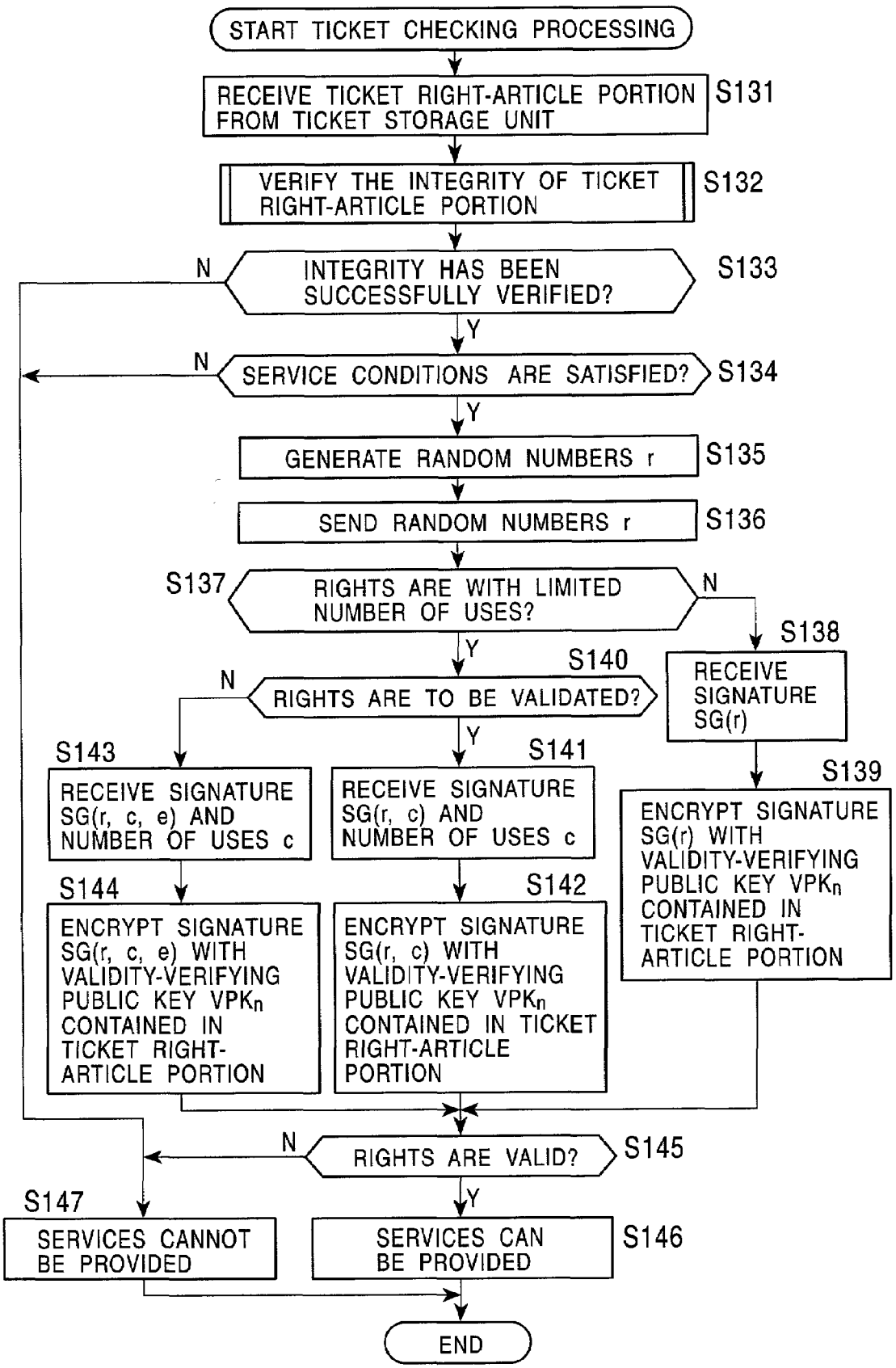
FIG. 18 is a flow chart illustrating the ticket checking processing.

A description is now given, with reference to the flow chart of FIG. 18, of the ticket checking processing performed by the ticket checking device $5_S$ shown in FIG. 17 when checking an electronic ticket stored in the ticket storage device $4_U$.

Figure 16:
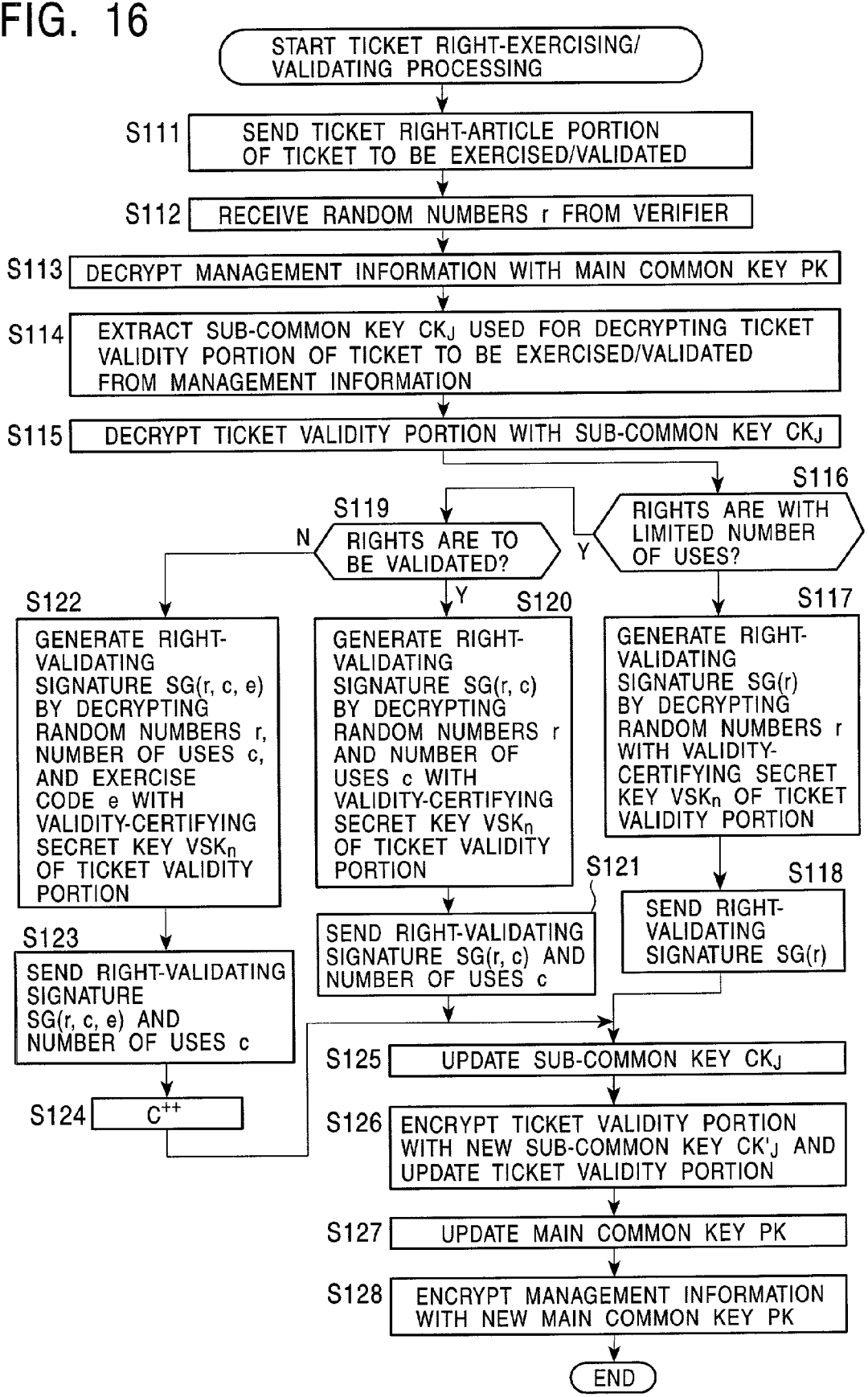
FIG. 16 is a flow chart illustrating the ticket right-exercising/validating processing.

In step S131, the ticket checking controller 31 receives the ticket right-article portion of the selected electronic ticket, which is sent in step S111 of FIG. 16 for performing the ticket right-exercising/validating processing by the ticket storage device $4_U$.

In step S132, the ticket checking controller 31 performs the verifying processing for the ticket right-article portion discussed with reference to FIG. 11 so as to verify the integrity of the ticket right-article portion received in step S131.

The ticket checking controller 31 then determines in step S133 whether the integrity of the ticket right-article portion has been successfully verified. If the outcome of step S133 is no, the process proceeds to step S147. In step S147, the ticket checking controller 31 determines that the services cannot be provided since the ticket right-article portion is tampered with. The ticket checking processing is then terminated.

In this case, the user of the ticket storage device $4_U$ is unable to receive the services from the service provider. For example, if the ticket checking device $5_S$ is a train ticket gate, the user is prevented from passing through the ticket gate.

If it is found in step S133 that the integrity of the ticket right-article portion has been successfully verified, the process proceeds to step S134. In step S134, the ticket checking controller 31 determines whether the ticket right-article information TI contained in the ticket right-article portion matches the service conditions stored in the checking-content storage unit 33. If the ticket checking device $5_S$ is integrated in the ticket storage device $4_U$ and is used for verifying the validity of an electronic ticket to be assigned, step S134 is skipped.

If the outcome of step S134 is no, i.e., for example, if the electronic ticket is an event ticket when the ticket checking device $5_S$ is a train ticket gate, the process proceeds to step S147. In step S147, the ticket checking controller 31 determines that the services cannot be provided, and the ticket checking processing is terminated. The user is thus unable to receive the services from the service provider.

If it is found in step S134 that the ticket right-article information TI matches the service conditions, the process proceeds to step S135. In step S135, the ticket checking controller 31 controls the random-number generator 32 to generate random numbers r for performing authentication by the challenge and response authentication technique. In step S136, the ticket checking controller 31 sends the received random numbers r to the ticket storage device $4_U$.

In step S137, by referring to the ticket right-article information TI, the ticket checking controller 31 determines whether the rights associated with the selected electronic ticket are provided with a restricted number of uses.

If the result of step S137 is no, the process proceeds to step S138. In step S138, the ticket checking controller 31 receives the right-validating signature SG(r), which is sent from the ticket storage device $4_U$ in step S118 of FIG. 16 for performing the above-described ticket right-exercising/validating processing.

Then, in step S139, the ticket checking controller 31 verifies the right-validating signature SG(r) received in step S138.

More specifically, the ticket checking controller 31 extracts the validity-verifying public key $VPK_n$ from the ticket right-article portion, and supplies the validity-verifying public key $VPK_n$ together with the right-validating signature SG(r) to the signature processor 34. The ticket checking controller 31 then controls the signature processor 34 to verify the right-validating signature SG(r).

In this case, the signature processor 34 encrypts the right-validating signature SG(r) with the validity-verifying public key $VPK_n$, and determines whether the encryption result coincides with the random numbers r obtained in step S136. The signature processor 34 then supplies a determination result to the ticket checking controller 31.

The right-validating signature SG(r) has been obtained by decrypting the one-way hash function h(r) of the random numbers r with the validity-certifying secret key $VSK_n$ in step S117 of FIG. 16. Accordingly, if the ticket storage device $4_U$ and the selected electronic ticket are valid, the encryption result $E(VPK_n, SG(r))$ obtained by encrypting the right-validating signature $SG(r) = D(VSK_n, h(r))$ with the validity-verifying public key $VPK_n$ must be equal to the one-way hash function h(r) of the random numbers r.

In step S145, upon receiving the determination result from the signal processor 34, the ticket checking controller 31 determines whether the rights associated with the electronic ticket are valid based on the determination result. If the outcome of step S145 is no, this means that the presence of the validity-certifying secret key $VSK_n$ for validating the electronic ticket cannot be identified. Then, the process proceeds to step S147 in which the ticket checking controller 31 determines that the services cannot be provided. The ticket checking processing is then terminated. In this case, the user is unable to receive the services from the service provider.

If it is found in step S145 that the rights associated with the electronic ticket are valid, i.e., that the presence of the validity-certifying secret key $VSK_n$ representing the validity of the selected electronic ticket is verified, the process proceeds to step S146. In step S146, the ticket checking controller 31 determines that the services can be provided. The ticket checking processing is then completed. In this case, the user is able to receive the services from the service provider.

If it is found in step S137 that the rights associated with the selected electronic ticket are provided with a limited number of uses, the process proceeds to step S140 in which a determination is further made as to whether the rights associated with the electronic ticket are to be validated. In the ticket checking device $5_S$, the information indicating whether the rights are to be validated or exercised is set. Accordingly, the determination of step S140 is made based on the information.

If it is found in step S140 that the rights are to be validated, the process proceeds to step S141. In step S141, the ticket checking controller 31 receives the right-validating signature SG(r,c) and the number of uses c, which are sent from the ticket storage device $4_U$ in step S121 of FIG. 16.

Then, in step S142, the ticket checking controller 31 verifies the right-validating signature SG(r,c) received in step S141.

More specifically, the ticket checking controller 31 extracts the validity-verifying public key $VPK_n$ from the ticket right-article portion, and supplies the validity-verifying public key $VPK_n$ together with the right-validating signature SG(r,c) and the number of uses c to the signature processor 34. The ticket checking controller 31 then controls the signature processor 34 to verify the right-validating signature SG(r,c).

In this case, the signature processor 34 encrypts the right-validating signature SG(r,c) with the validity-verifying public key $VPK_n$, and determines whether the encryption result coincides with the random numbers r obtained in step S136 and the number of uses c. The signature processor 34 then sends a determination result to the ticket checking controller 31.

The right-validating signature SG(r,c) has been obtained by decrypting the one-way hash function h(r,c) of the random numbers r and the number of uses c with the validity-certifying secret key $VSK_n$ in step S120 of FIG. 16. Accordingly, if the ticket storage device $4_U$ and the selected electronic ticket are valid, the encryption result $E(VPK_n, SG(r,c))$ obtained by encrypting the right-validating signature $SG(r,c)=D(VSK_n, h(r,c))$ with the validity-verifying public key $VPK_n$ must be equal to the one-way hash function h(r,c) of the random numbers r and the number of uses c.

In step S145, upon receiving the determination result from the signal processor 34, the ticket checking controller 31 determines whether the rights associated with the electronic ticket are valid based on the determination result. If the outcome of step S145 is no, this means that the presence of the validity-certifying secret key $VSK_n$ for validating the electronic ticket cannot be identified in the ticket storage device $4_U$. Then, the process proceeds to step S147 in which the ticket checking controller 31 determines that the services cannot be provided, and controls the display unit 36 to display that the electronic ticket is not valid. The ticket checking processing is then terminated. In this case, the user is unable to receive the services from the service provider.

When the rights associated with the selected electronic ticket are provided with a limited number of uses, the outcome of step S145 becomes no if the encryption result of the right-validating signature SG(r,c) with the validity-verifying public key $VPK_n$ does not coincide with the random numbers r and the number of uses c. However, even if the encryption result coincides with the random numbers r and the number of times c, it is determined in step S145 that the rights associated with the electronic ticket are not valid if the number of uses c exceeds the maximum number of uses described in the ticket right-article information TI contained in the ticket right-article portion.

For an electronic ticket with an effective period, it is also determined in step S145 whether the current time and date exceeds the effective period described in the ticket right-article information TI. If the current time and date exceeds the effective period, the rights associated with the electronic ticket are not valid.

If it is found in step S145 that the rights associated with the electronic ticket are valid, i.e., that the encryption result of the right-validating signature SG(r,c) with the validity-verifying public key $VPK_n$ is equal to the random numbers r and the number of uses c, and that the number of uses c does not exceed the maximum number of uses described in the ticket right-article information TI, the process proceeds to step S146. In step S146, the ticket checking controller 31 determines that the services can be provided, and the ticket checking processing is then completed. In this case, the user is able to receive the services from the service provider.

If it is found in step S140 that the rights associated with the electronic ticket are not to be validated, this means that the rights are to be exercised. This applies to the case in which, for example, the electronic ticket is a train ticket, and the user attempts to pass through a ticket gate with the electronic ticket. Then, the process proceeds to step S143 in which the ticket checking controller 31 receives the right-validating signature SG(r,c,e) and the number of uses c, which is sent from the ticket storage device $4_U$ in step S123.

Then, in step S144, the ticket checking controller 31 verifies the right-validating signature SG(r,c,e) received in step S143.

More specifically, the ticket checking controller 31 extracts the validity-verifying public key $VPK_n$ from the ticket right-article portion, and supplies the validity-verifying public key $VPK_n$ together with the right-validating signature SG(r,c,e) and the number of uses c to the signature processor 34. The ticket checking controller 31 then controls the signature processor 34 to verify the right-validating signature SG(r,c,e).

In this case, the signature processor 34 encrypts the right-validating signature SG(r,c,e) with the validity-verifying public key $VPK_n$, and determines whether the encryption result coincides with the random numbers r, the number of uses c, and the exercise code e obtained in step S136. The signature processor 34 then supplies a determination result to the ticket checking controller 31.

The right-validating signature SG(r,c,e) has been obtained by decrypting the one-way hash function h(r,c,e) of the random numbers r, the number of uses c, and the exercise code e with the validity-certifying secret key $VSK_n$ in step S122 of FIG. 16. Accordingly, if the ticket storage device $4_U$ and the selected electronic ticket are valid, the encryption result $E(VPK_n, SG(r,c,e))$ obtained by encrypting the right-validating signature $SG(r,c,e)=D(VSK_n, h(r,c,e))$ with the validity-verifying public key $VPK_n$ must be equal to the one-way hash function h(r,c,e) of the random numbers r, the number of uses c, and the exercise code e.

In step S145, upon receiving the determination result from the signal processor 34, the ticket checking controller 31 determines whether the rights associated with the electronic ticket are valid based on the determination result. If the outcome of step S145 is no, this means that the presence of the validity-certifying secret key $VSK_n$ for validating the electronic ticket cannot be identified in the ticket storage device $4_U$, or a valid exercise code e is not contained in the right-validating signature SG from the ticket storage device $4_U$. Then, the process proceeds to step S147 in which the ticket checking controller 31 determines that the services cannot be provided. The ticket checking processing is then terminated. In this case, the user is unable to receive the services from the service provider.

As in validating the rights of the electronic ticket, when exercising the rights of the electronic ticket, it is determined in step S145 whether the number of uses c exceeds the maximum number of uses described in the ticket right-article information TI of the right-article portion or whether the current time and date exceeds the effective period described in the ticket right-article information TI.

If it is found in step S145 that the rights associated with the electronic ticket are valid, i.e., that the encryption result of the right-validating signature SG(r,c,e) with the validity-verifying public key $VPK_n$ is equal to the random numbers r, the number of uses c, and the exercise code e, and that the presence of the validity-certifying secret key $VSK_n$ indicating the validity of the electronic ticket is identified in the ticket storage device $4_U$, and that the number of uses c does not exceed the maximum number of uses described in the ticket right-article information TI, and that a valid exercise code e is contained in the right-validating signature SG(r,c, e), the process proceeds to step S146. In step S146, the ticket checking controller 31 determines that the services can be provided, and the ticket checking processing is completed. In this case, the user is able to receive the services from the service provider.

A series of the above-described processing may be implemented by hardware or software. If software is used for performing the above-described processing, a corresponding software program is installed in a general-purpose computer.

Figure 19:
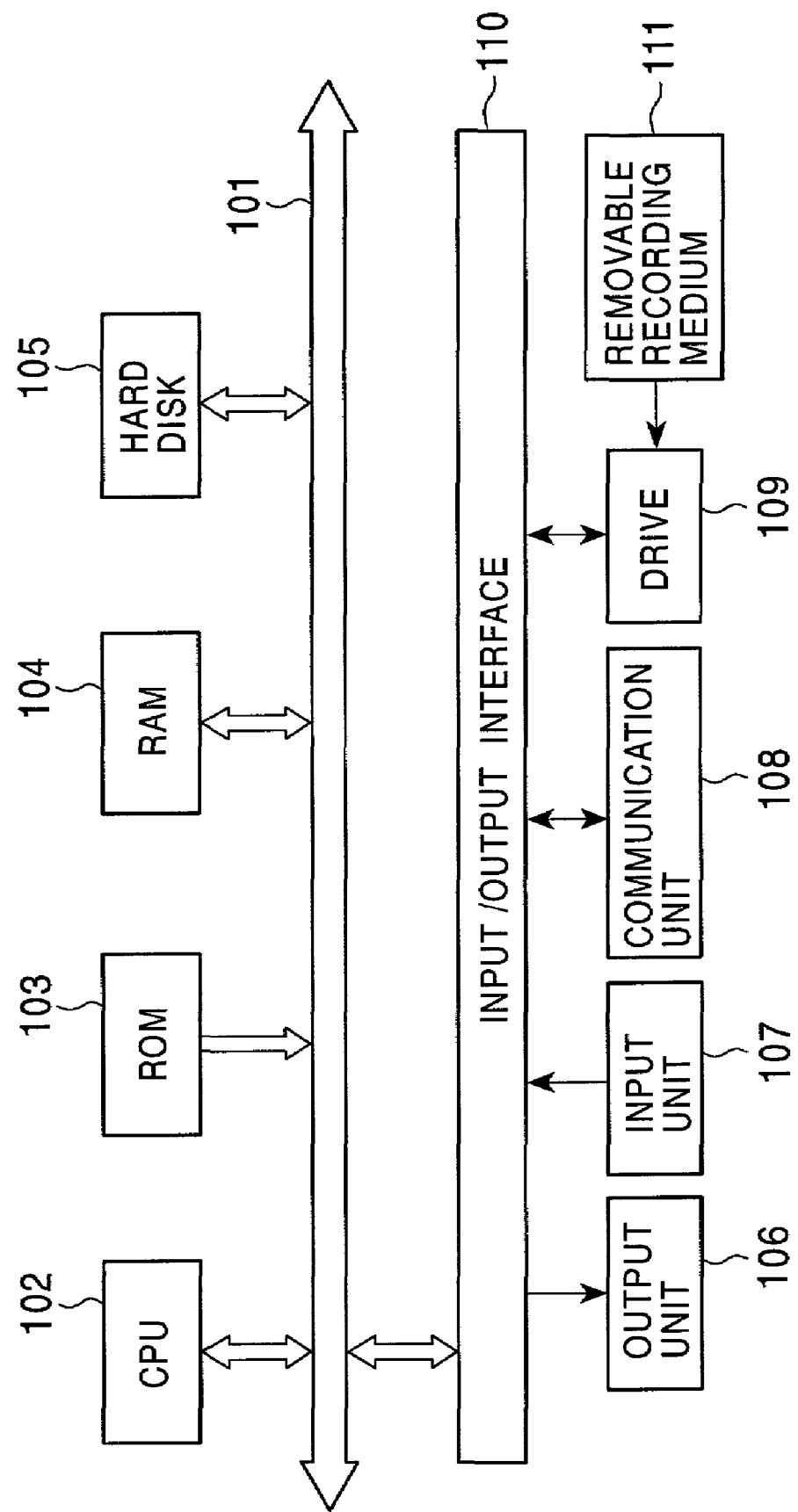
FIG. 19 is a block diagram illustrating the configuration of a computer incorporating the present invention.

FIG. 19 is a block diagram illustrating the configuration of a computer into which a program for executing the above-described processing is installed.

The program can be recorded on a hard disk 105 or a read only memory (ROM) 103, which serves as a recording medium integrated in the computer.

Alternatively, the program may be temporally or permanently stored (recorded) in a removable recording medium 111, such as a floppy disk, a compact disc read only memory (CD-ROM), a magneto-optical (MO) disk, a digital versatile disk (DVD), a magnetic disk, or a semiconductor memory. The removable recording medium 111 may be provided as package software.

Instead of installing the program from the removable recording medium 111 into the computer, the program may be transferred wirelessly from a download site into the computer via a digital broadcasting satellite, or by cable via a network, such as a local area network (LAN) or the Internet, and the computer may receive the program by a communication unit 108 and install it into the built-in hard disk 105.

The computer has a built-in central processing unit (CPU) 102. An input/output interface 110 is connected to the CPU 102 via a bus 101. In response to an instruction input from a user by operating an input unit 107, such as a keyboard, a mouse, a microphone, etc., the CPU 102 receives such an instruction via the input/output interface 110 and executes the program stored in the ROM 103. Alternatively, the CPU 102 may load a program stored in the hard disk 105 into a random access memory (RAM) 104, and executes the program. Such a program may be stored in the hard disk 105 in advance, or may be transferred from a satellite or a network, received by the communication unit 108, and installed into the hard disk 105, or may be read from the removable recording medium 111 loaded in a drive 109 and installed into the hard disk 105. Accordingly, the CPU 102 performs the processing indicated by the above-described flow charts, or the processing performed by the devices shown in the above-described block diagrams. The CPU 102 then outputs a processing result from an output unit 106, such as a liquid crystal display (LCD) device or a speaker, via the input/output interface 110, or sends the processing result from the communication unit 108, or records it on the hard disk 105.

It is not essential that the steps forming the program for performing the above-described processing be executed chronologically according to the order discussed in this specification. Alternatively, they may be executed concurrently or individually by concurrent processing or object processing.

The program may be processed by a single computer. Alternatively, distributed processing may be performed on the program by using a plurality of computers. Alternatively, the program may be transferred to a remote computer and be executed.

According to the foregoing description, known tickets, such as transportation tickets, entrance tickets, reserved tickets, membership cards, license cards, and service tickets, are digitized, and are sent and received via a communication path, such as a network. Such an electronic ticket includes a ticket validity portion containing a validity-certifying secret key $VSK_n$, which can be validated without being exposed, and used for verifying the validity of the electronic ticket, and a ticket right-article portion containing a validity-verifying public key $VPK_n$ for verifying the presence of the validity-certifying secret key $VSK_n$, the ticket right-article portion being validated by the validity-certifying secret key $VSK_n$. It is thus possible to distribute electronic tickets having the functions comparable to those of known tickets.

That is, the electronic tickets are provided with the five functions, i.e., a "right copy-preventing function" for preventing the rights associated with an electronic ticket from being illegally copied, a "right-validating function" for proving the validity of the rights associated with the electronic ticket to a third party including anonymous users, an "anonymity function" for guaranteeing the anonymity of users utilizing the electronic ticket, an "assignment function" for assigning the rights associated with the electronic ticket to others, and a "completeness function" for validating the rights associated with the electronic ticket only by using the electronic ticket.

In the ticket validity portion, not only the validity-certifying secret key $VSK_n$, but also additional information, such as the number of uses, can be stored. Thus, highly convenient electronic tickets with a limited number of uses can be implemented. In this case, it is possible to prevent the number of uses from being tampered with.

In the foregoing embodiment, the present invention is used in an electronic ticketing system. However, the present invention may be implemented by a program executed by a computer. That is, the ticket right-article information TI of the ticket right-article portion may be implemented by a program, and the ticket storage device $4_U$ may store such a program. The functions of the ticket checking device $5_T$ may be provided for the operating system or an application program in the computer, or part of the program stored in the storage unit so as to verify the rights to use the program. It is thus possible to protect the rights, such as a copyright, concerning the program.

In the above-described embodiment, the public-key cryptosystem, the common-key cryptosystem, and the digital signatures are used. However, algorithms used for these systems are not restricted.

What is claimed is:

1. An information processing apparatus comprising:
validity-data generating means for generating validity data including secret information to which an algorithm whose presence is verifiable without being exposed is applicable, said validity data being used for verifying the validity of information;
verifying-parameter generating means for generating a verifying parameter for verifying the presence of the secret information;
information-to-be-validated generating means for generating information to be validated which includes the verifying parameter and which is validated by the validity data; and
output means for outputting a set of information consisting of the validity data and the information to be validated,
wherein the set of information forms an electronic ticket, wherein said output means encrypts the validity data and then outputs the encrypted validity data, and
wherein said output means sends a device certificate to an external device, said device certificate including a public key used in a public key cryptosystem, and a digital signature generated by a predetermined certifying center for the public key so as to certify that said information processing apparatus is a legal device, and said output means decrypts, by using a secret key corresponding to the public key, an encryption key which is encrypted with the public key contained in the device certificate and which is sent from said external device, and encrypts the validity data with the decrypted encryption key.

2. An information processing apparatus comprising:
validity-data generating means for generating validity data including secret information to which an algorithm whose presence is verifiable without being exposed is applicable, said validity data being used for verifying the validity of information;
verifying-parameter generating means for generating a verifying parameter for verifying the presence of the secret information;
information-to-be-validated generating means for generating information to be validated which includes the verifying parameter and which is validated by the validity data; and
output means for outputting a set of information consisting of the validity data and the information to be validated
wherein said set of information forms an electronic ticket, and
wherein said validity-data generating means generates the validity data which includes a secret key in a public key cryptosystern as the secret information, and said verifying-parameter generating means generates a public key corresponding to the secret key as the verifying parameter.

3. An information processing apparatus comprising:
validity-data generating means for generating validity data including secret information to which an algorithm whose presence is verifiable without being exposed is applicable, said validity data being used for verifying the validity of information;
verifying-parameter generating means for generating a verifying parameter for verifying the presence of the secret information;
information-to-be-validated generating means for generating information to be validated which includes the verifying parameter and which is validated by the validity data; and
output means for outputting a set of information consisting of the validity data and the information to be validated
wherein said set of information forms an electronic ticket, and
wherein said information-to-be-validated generating means generates the information to be validated which further comprises an issuer certificate including issuer identifying information for identifying an issuer of the electronic ticket, a public key for verifying the issuer, and a digital signature generated by a predetermined certifying center for the issuer identifying information and the public key, thereby certifying the issuer of the electronic ticket.

4. An information processing apparatus for processing a set of information which comprises: validity data including secret information to which an algorithm whose presence is verifiable without being exposed is applicable, said validity data being used for verifying the validity of information; and
information to be validated, including a verifying parameter for verifying the presence of the secret information, said information being validated by said validity data, said information processing apparatus comprising:
storage means for storing said set of information;
information-to-be-validated transmission means for transmitting the information to be validated to a checking device for checking the information to be validated;
verifying-data generating means for generating verifying data for verifying the presence of the secret information and for transmitting the verifying data to said checking device;
first encryption means for encrypting the validity data with a first encryption key;
first decryption means for decrypting the validity data encrypted with the first encryption key by using the first encryption key, wherein said storage means stores the validity data encrypted with the first encryption key;
second encryption means for encrypting the first encryption key with a second encryption key; and p1 second decryption means for decrypting the first encryption key encrypted with the second encryption key by using the second encryption key, wherein said storage means also stores the first encryption key encrypted with the second encryption key.

5. An information processing apparatus according to claim 4, wherein the first encryption key is updated with a predetermined timing.

6. An information processing apparatus according to claim 4, wherein the second encryption key is integrated into hardware which forms said second encryption means and said second decryption means.

7. An information processing apparatus according to claim 4, wherein the second encryption key is updated with a predetermined timing.

8. An information processing apparatus for processing a set of information which comprises:
validity data including secret information to which an algorithm whose presence is verifiable without being exposed is applicable, said validity data being used for verifying the validity of information; and information to be validated, including a verifying parameter for verifying the presence of the secret information, said information being validated by said validity data, said information processing apparatus comprising:

storage means for storing said set of information;

information-to-be-validated transmission means for transmitting the information to be validated to a checking device for checking the information to be validated; and varifying-data generating means for generating verifying data for verifying the presence of the secret information and for transmitting the verifying data to said checking device, wherein said set of information is an electronic ticket, and wherein the secret information is a secret key used in a public key cryptosystem, and the verifying parameter is a public key corresponding to the secret key, and said verifying-data generating means generates the verifying data by performing processing using the secret key.

9. An information processing apparatus according to claim 5, wherein the information to be validated further includes content of rights associated with the electronic ticket.

10. An information processing apparatus according to claim 5, wherein the information to be validated is processed so as to be prevented from being tampered with.

11. An information processing apparatus according to claim 10, wherein the information to be validated includes a digital signature so as to be prevented from being tampered with.

12. An information processing apparatus according to claim 8, wherein the validity data includes the number of uses of the electronic ticket, and said verifying-data generating means processes predetermined information and the number of uses with the secret key, and sends a processing result and the number of uses.

13. An information processing apparatus according to claim 8, further comprising incrementing means for incrementing the number of uses contained in the validity data stored in said storage means every time said verifying-data generating means sends the number of uses.

14. An information processing apparatus according to claim 5, further comprising assigning means for assigning information of the electronic ticket to an external device.

15. An information processing apparatus according to claim 14, further comprising authentication means for performing authentication processing with said external device when assigning the electronic ticket information to said external device.

16. An information processing apparatus according to claim 14, wherein said assigning means encrypts the validity data of the electronic ticket and sends the encrypted validity data to said external device.

17. An information processing apparatus according to claim 16, wherein said assigning means sends a device certificate to said external device, said device certificate including a public key used in a public key cryptosystem, and a digital signature generated by a predetermined certifying center for the public key so as to certify that said information processing apparatus is a legal device, and said assigning means decrypts, by using a secret key corresponding to the public key, an encryption key which is encrypted with the public generating key contained in the device certificate and which is sent from said external device, and encrypts the validity data with the decrypted encryption key.

18. An information processing apparatus according to claim 14, wherein said assigning means assigns the electronic ticket information to said external device and also deletes the electronic ticket information from said storage means.

19. An information processing apparatus according to claim 8, further comprising assignment-receiving means for receiving information of the electronic ticket from an external device.

20. An information processing apparatus according to claim 19, further comprising authentication means for performing authentication processing with said external device when receiving the electronic ticket information.

21. An information processing apparatus according to claim 20, wherein said assignment-receiving means verifies the validity of the information to be validated sent from said external device.

22. An information processing apparatus according to claim 21, wherein the information to be validated further comprises an issuer certificate including issuer identifying information for identifying an issuer of the electronic ticket, a public key for verifying the issuer, and a digital signature generated by a predetermined certifying center for the issuer identifying information and the public key, thereby certifying the issuer of the electronic ticket, and said assignment-receiving means verifies the validity of the information to be validated based on the issuer certificate.

23. An information processing apparatus according to claim 22, wherein the information to be validated includes a digital signature generated by a secret key corresponding to the public key, and said assignment-receiving means verifies the validity of the information to be validated by processing the digital signature with the public key.

24. An information processing apparatus according to claim 19, wherein said assignment-receiving means receives the encrypted validity data.

25. An information processing apparatus according to claim 24, wherein said assignment-receiving means receives a device certificate including a public key used in a public key cryptosystem, and a digital signature generated by a predetermined certifying center for the public key so as to certify that said external device is a legal device, and said assignment-receiving means sends a predetermined encryption key encrypted with the public key contained in the device certificate to said external device, and receives the validity data encrypted with the predetermined encryption key.

26. An information processing apparatus according to claim 21, wherein the information to be validated includes a digital signature, and said assignment-receiving means verifies the validity of the information to be validated based on the digital signature.

27. An information processing method for processing a set of information which comprises: validity data including secret information to which an algorithm whose presence is verifiable without being exposed is applicable, said validity data being used for verifying the validity of information; and information to be validated, including a verifying parameter for verifying the presence of the secret information, said information being validated by said validity data, said information processing method comprising:

an information-to-be-validated transmission step of transmitting the information to be validated to a checking device for checking the information to be validated; and a verifying-data generating step of generating verifying data for verifying the presence of the secret information and for transmitting the verifying data to said checking device.

28. A program recording medium for recording a program which controls a computer to process a set of information, said set of information comprising:

validity data including secret information to which an algorithm whose presence is verifiable without being exposed is applicable, said validity data being used for verifying the validity of information; and information to be validated, including a verifying parameter for verifying the presence of the secret information, said information being validated by said validity data, said program comprising:

an information-to-be-validated transmission step of transmitting the information to be validated to a checking device for checking the information to be validated; and a verifying-data generating step of generating verifying data for verifying the presence of the secret information and for transmitting the verifying data to said cheeking device.

29. An information processing apparatus for checking a set of information which comprises: validity data including secret information to which an algorithm whose presence is verifiable without being exposed is applicable, said validity data being used for verifying the validity of information; and information to be validated, including a verifying parameter for verifying the presence of the secret information, said information being validated by said validity data, said information processing apparatus comprising:

information-to-be-validated receiving means for receiving the information to be validated from an external device;

verifying-data receiving means for receiving verifying data for verifying the presence of the secret information from said external device; and presence determining means for determining the presence of the secret information in said external device by using the verifying data and the verifying parameter contained in the information to be validated.

30. An information processing apparatus according to claim 29, wherein said set of information is an electronic ticket.

31. An information processing apparatus according to claim 30, wherein the information to be validated further includes content of rights associated with the electronic ticket, and said information processing apparatus further comprises right determining means for determining whether the content of rights satisfies predetermined service providing conditions.

32. An information processing apparatus according to claim 30, wherein: the secret information is a secret key used in a public key cryptosystem;

the verifying parameter is a public key corresponding to the secret key;

the verifying data is generated by processing using the secret key contained in the validity data; and said presence determining means determines the presence of the secret key by processing the verifying data with the public key.

33. An information processing apparatus according to claim 32, wherein the validity data includes the number of uses of the electronic ticket, and the verifying data is formed of the number of uses and a processing result obtained by processing predetermined information and the number of uses with the secret key.

34. An information processing apparatus according to claim 30, further comprising checking means for checking the validity of the information to be validated sent from said external device.

35. An information processing apparatus according to claim 34, wherein the information to be validated further comprises an issuer certificate information including issuer identifying information for identifying an issuer of the electronic ticket, a public key for verifying the issuer, and a digital signature generated by a predetermined certifying center for the issuer identifying information and the public key, thereby certifying the issuer of the electronic ticket, and said checking means checks the validity of the information to be validated based on the issuer certificate.

36. An information processing apparatus according to claim 35, wherein the information to be validated includes a digital signature generated by a secret key corresponding to the public key, and said checking means checks the validity of the information to be validated by processing the digital signature with the public key.

37. An information processing apparatus according to claim 34, wherein the information to be validated includes a digital signature, and said checking means checks the validity of the information to be validated based on the digital signature.

38. An information processing method for checking a set of information which comprises: validity data including secret information to which an algorithm whose presence is verifiable without being exposed is applicable, said validity data being used for verifying the validity of information; and information to be validated, including a verifying parameter for verifying the presence of the secret information, said information being validated by said validity data, said information processing method comprising:

an information-to-be-validated receiving step of receiving the information to be validated from an external device;

a verifying-data receiving step of receiving verifying data for verifying the presence of the secret information from said external device; and a presence determining step of determining the presence of the secret information in said external device by using the verifying data and the verifying parameter contained in the information to be validated.

39. A program recording medium for recording a program which controls a computer to perform processing for checking a set of information which comprises: validity data including secret information to which an algorithm whose presence is verifiable without being exposed is applicable, said validity data being used for verifying the validity of information; and information to be validated, including a verifying parameter for verifying the presence of the secret information, said information being validated by said validity data, said program comprising:

an information-to-be-validated receiving step of receiving the information to be validated from an external device;

a verifying-data receiving step of receiving verifying data for verifying the presence of the secret information from said external device; and a presence determining step of determining the presence of the secret information in said external device by using the verifying data and the verifying parameter contained in the information to be validated.

40. An information processing system comprising a first information processing apparatus, a second information processing apparatus, and a third information processing apparatus, said first information processing apparatus comprising:

validity-data generating means for generating validity data including secret information to which an algorithm whose presence is verifiable without being exposed is applicable, said validity data being used for verifying the validity of information;

verifying-parameter generating means for generating a verifying parameter for verifying the presence of the secret information;

information-to-be-validated generating means for generating information to be validated which includes the verifying parameter and which is validated by the validity data; and output means for outputting a set of information consisting of the validity data and the information to be validated, said second information processing apparatus comprising:

storage means for storing said set of information;

information-to-be-validated transmission means for transmitting the information to be validated to said third information processing apparatus for checking the information to be validated; and verifying-data generating means for generating verifying data for verifying the presence of the secret information and for transmitting the verifying data to said third information processing apparatus, said third information processing apparatus comprising:

information-to-be-validated receiving means for receiving the information to be validated from said second information processing apparatus;

verifying-data receiving means for receiving the verifying data for verifying the presence of the secret information from said second information processing apparatus; and presence determining means for determining the presence of the secret information in said second information processing apparatus by using the verifying data and the verifying parameter contained in the information to be validated.

* * * * *